(12) United States Patent
Brehmer et al.

(10) Patent No.: US 9,116,628 B2
(45) Date of Patent: Aug. 25, 2015

(54) APPARATUS AND METHOD FOR PROVIDING A MULTICORE PROGRAMMING PLATFORM

(71) Applicants: Sven Brehmer, Foster City, CA (US); Tamer Abuelata, Cupertino, CA (US); David Turner, Lansdale, PA (US)

(72) Inventors: Sven Brehmer, Foster City, CA (US); Tamer Abuelata, Cupertino, CA (US); David Turner, Lansdale, PA (US)

(73) Assignee: POLYCORE SOFTWARE, INC., Burlingame, CA (US)

( * ) Notice: Subject to any disclaimer, the term of this patent is extended or adjusted under 35 U.S.C. 154(b) by 250 days.

(21) Appl. No.: 13/850,194

(22) Filed: Mar. 25, 2013

(65) Prior Publication Data

US 2013/0254510 A1    Sep. 26, 2013

Related U.S. Application Data

(60) Provisional application No. 61/615,095, filed on Mar. 23, 2012.

(51) Int. Cl.
*G06F 3/06* (2006.01)
*G06F 9/50* (2006.01)

(52) U.S. Cl.
CPC ............ *G06F 3/0629* (2013.01); *G06F 9/5016* (2013.01); *Y02B 60/142* (2013.01)

(58) Field of Classification Search
CPC .................................................... G06F 12/023
See application file for complete search history.

(56) References Cited

U.S. PATENT DOCUMENTS

| 5,790,130 | A | 8/1998 | Gannett |
| 7,584,465 | B1 | 9/2009 | Koh et al. |
| 2004/0148480 | A1 | 7/2004 | Watt et al. |
| 2005/0144422 | A1 | 6/2005 | McAlpine et al. |
| 2010/0235847 | A1 | 9/2010 | Brehmer et al. |
| 2011/0055487 | A1 | 3/2011 | Sapronov et al. |
| 2011/0126209 | A1 | 5/2011 | Housty |

OTHER PUBLICATIONS

International Search Report and Written Opinion issued Jun. 28, 2013 in PCT/US13/33707.

*Primary Examiner* — Yong Choe
(74) *Attorney, Agent, or Firm* — Oblon, McClelland, Maier & Neustadt, L.L.P.

(57) ABSTRACT

A computer-implemented method for generating a memory map of a target computer includes specifying, from a plurality of identifiers stored in a memory of a host computer, at least one identifier associated with a memory layout of the target computer. The method further includes specifying a value associated with the specified at least one identifier. The method further includes generating a memory map definition of the memory map using the at least one identifier and the associated at least one value. The method also includes deploying software on the target computer, the software incorporating the memory map definition and including an executable instruction that references the at least one identifier which is replaced with the associated value.

48 Claims, 36 Drawing Sheets

Constants
» Add Constant   ↻ Insert Constant   ⊖ Delete   ⊙ Move Up   ⊙ Move Down
| Constant Name | Constant Value |
|---|---|
| IO_BUFFER_SIZE_1 | 1024 |
| IO_BUFFER_SIZE_2 | 2048 |
| IO_BUFFER_SIZE_4 | 4096 |
| IO_BUF_NUM_MAX | 256 |
Fig. 4e
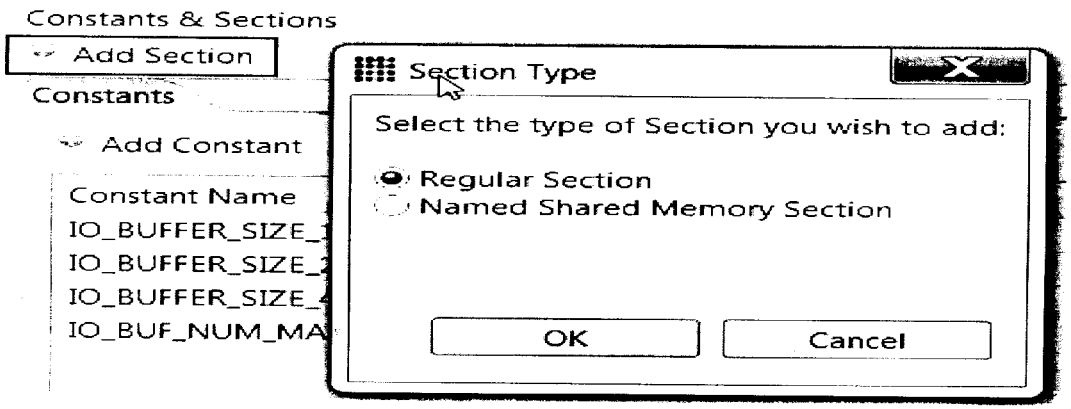
Fig. 4f
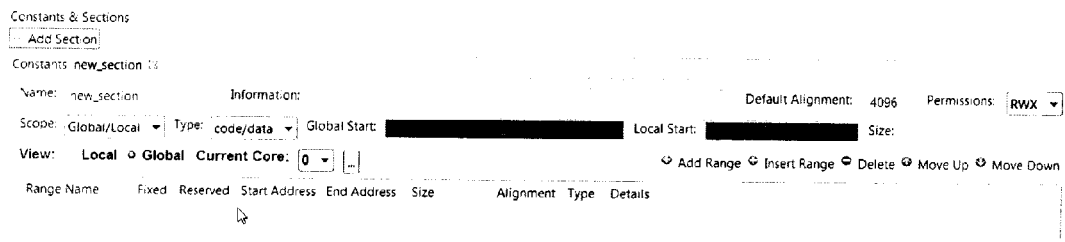
Fig. 4g

| Address Name | Reserved | Start Address | Type | Details |
|---|---|---|---|---|
| DMA_REGISTER_0 | | 0x70200000 | | ... |
| DMA_REGISTER_1 | | 0x70200004 | | ... |
| DMA_REGISTER_2 | | 0x70200008 | | ... |
| DMA_REGISTER_3 | | 0x7020000C | | ... |
| DMA_REGISTER_4 | | 0x70200010 | | ... |
| DMA_REGISTER_5 | | 0x70200014 | | ... |
| DMA_REGISTER_6 | | 0x70200018 | | ... |
| DMA_REGISTER_7 | | 0x7020001C | | ... |

Constants & Sections
⌄ Add Section
Constants IO Global ⌧

| Name: | IO Global | | Information: | IO memory, physical | | | | |
|---|---|---|---|---|---|---|---|---|
| Scope: | Global ▼ | Type: code/data ▼ | Global Start: | 0x70000000 | | | | Local |
| View: | Local | Global | Current Core: 0 ▼ | ... | | | | |

| Range Name | Fixed | Reserved | Start Address | End Address | Size | Alignment | Type | Details |
|---|---|---|---|---|---|---|---|---|
| IOBuffer0 | | | 0x70000000 | 0x70000FFF | 4096 | 4096 | | ... |
| IOBuffer1 | | | 0x70001000 | 0x70001FFF | 4096 | 4096 | | ... |
| IOBuffer2 | ✓ | | 0x70002000 | 0x70002FFF | 4096 | 4096 | | ... |
| IOBuffer3 | | ✓ | 0x70003000 | 0x70003FFF | 4096 | 4096 | | ... |
| IOBuffer4 | | | 0x70004000 | 0x70004FFF | 4096 | 4096 | | ... |
| IOBuffer5 | | | 0x70005000 | 0x70005FFF | 4096 | 4096 | | ... |

Fig. 4q

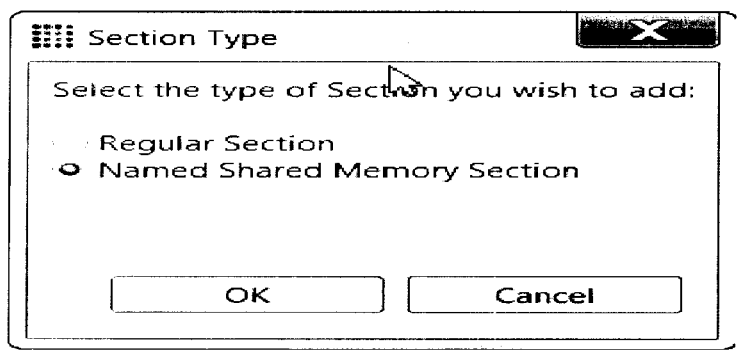

```
//Constants
#define MMAP_MC_PLATFORM_CONST_BUF_SIZE 65536
#define MMAP_MC_PLATFORM_CONST_MAX_NUM_BUF 64

//Section SRAM
//Description: SRAM memory
#define MMAP_MC_PLATFORM_SECT_SRAM_SIZE 262144
#define MMAP_MC_PLATFORM_SECT_SRAM_GLOBAL_START
0x20000000
```

Fig. 5b

```
//Constants
#define MMAP_MC_PLATFORM_CONST_BUF_SIZE 65536
#define MMAP_MC_PLATFORM_CONST_MAX_NUM_BUF 64

//Section SRAM
//Description: SRAM memory
#define MMAP_MC_PLATFORM_SECT_SRAM_SIZE 2097152
#define MMAP_MC_PLATFORM_SECT_SRAM_GLOBAL_START
0x20060000
```

Fig. 5c

```
unsigned int num_buffers = 0;
void *next_buffer = (void *)MMAP_MC_PLATFORM_SECT_SRAM_GLOBAL_START;

while(((unsigned int)next_buffer <
(MMAP_MC_PLATFORM_SECT_SRAM_GLOBAL_START +
MMAP_MC_PLATFORM_SECT_SRAM_SIZE)) &&
(num_buffers< MMAP_MC_PLATFORM_CONST_MAX_NUM_BUF))
{
next_buffer = memset(next_buffer, 0, MMAP_MC_PLATFORM_CONST_BUF_SIZE);

next_buffer += MMAP_MC_PLATFORM_CONST_BUF_SIZE;
num_buffers++;
}
```

Fig. 5d

```
static PolyMessagePoolDef tCombinedPool1_PoolDef =
{
    {POLY_COMBINED_POOL1_ID, POLY_COMBINED_POOL1_TYPE,
    POLY_MAR1_MEMORY_ACCESS_REGION_ID, 0,
    (PolyPoolHandle) &tCombinedPool1_PoolDriver,
    NULL, 0, (void *)
    MMAP_MC_PACKET_PROC_SECT_MW_SHARED_PHYS_RANGE_CMB1_GLOBAL_START,
"GATE_CMB1",  9, POLY_COMBINED_POOL1_ALLOC_SIZE, 0,
POLY_COMBINED_POOL1_BUFFER_SIZE, 0,   128},
    POLY_COMBINED_POOL1_SUBPOOLS_NUM,
    atCombinedPool1_QueueDefs,
    POLY_POOL_ID_INVALID, NULL,
    POLY_WAITER_POOL1_ID, NULL
};
```

Fig. 6d

| Property | Value | |
|---|---|---|
| Location | Shared_Global | |
| Allocation | Address | |
| Address | MMAP_MC_PACKET_PROC_SECT_MW_SHARED_PH... | (MEM) |
| Gate Key | GATE_CMB1 | |
| Allocation Size | 22016 | (CALC) |
| Caching | true | |
| Cache Alignment | 128 | |

| Property | Value | |
|---|---|---|
| Location | Shared_Global | |
| Allocation | Address | |
| Address | MMAP_MC_PACKET_PROC_SECT_MW_SHARED_PHYS_RANGE_CMB1_GLOBAL_START | |
| Gate Key | GATE_CMB1 | |
| Allocation Size | 22016 | (CALC) |
| Caching | true | |
| Cache Alignment | 128 | |

☐ Combined Pool CMB1 (MAR1)

Pool    Edit Combined Pool

Buffer
Pacing
Watermarking

| Property | Value |
|---|---|
| Header | With_Header |
| Name | CMB1 |
| Management | Software |
| Initializing Node | N0 |
| Memory Region | MAR1 |

Waiter Pool [Waiter Pool: WT1 ▼]    Data Buffer Size 65000    Number of Sub-pools 1

Fig. 6e-1

```
//Section Section A
//Description: Platform_1
#define MMAP_MC_PACKET_PROC_SECT_SECTION_A_SECTION_TYPE REGULAR_SECTION
#define MMAP_MC_PACKET_PROC_SECT_SECTION_A_NAME "Section A"
#define MMAP_MC_PACKET_PROC_SECT_SECTION_A_SIZE 524288
#define MMAP_MC_PACKET_PROC_SECT_SECTION_A_TYPE "code/data"
#define MMAP_MC_PACKET_PROC_SECT_SECTION_A_PERMISSIONS "RWX"
#define MMAP_MC_PACKET_PROC_SECT_SECTION_A_SCOPE SCOPE_GLOBAL
#define MMAP_MC_PACKET_PROC_SECT_SECTION_A_GLOBAL_START 0x70000000
#define MMAP_MC_PACKET_PROC_SECT_SECTION_A_NUM_RANGES 8
#define MMAP_MC_PACKET_PROC_SECT_SECTION_A_NUM_ADDRESSES 4
```

Fig. 9b

```
//Section Section A, Range Range_0
#define MMAP_MC_PACKET_PROC_SECT_SECTION_A_RANGE_RANGE_0_NAME "Range_0"
#define MMAP_MC_PACKET_PROC_SECT_SECTION_A_RANGE_RANGE_0_ALIGNMENT 4096
#define MMAP_MC_PACKET_PROC_SECT_SECTION_A_RANGE_RANGE_0_TYPE
#define MMAP_MC_PACKET_PROC_SECT_SECTION_A_RANGE_RANGE_0_SIZE 8192
#define MMAP_MC_PACKET_PROC_SECT_SECTION_A_RANGE_RANGE_0_GLOBAL_START 0x70000000
define MMAP_MC_PACKET_PROC_SECT_SECTION_A_RANGE_RANGE_0_GLOBAL_END 0x70001FFF //Section Section A, Range Range_1
define MMAP_MC_PACKET_PROC_SECT_SECTION_A_RANGE_RANGE_1_NAME "Range_1"
#define MMAP_MC_PACKET_PROC_SECT_SECTION_A_RANGE_RANGE_1_ALIGNMENT 4096
#define MMAP_MC_PACKET_PROC_SECT_SECTION_A_RANGE_RANGE_1_TYPE
#define MMAP_MC_PACKET_PROC_SECT_SECTION_A_RANGE_RANGE_1_SIZE 8192
#define MMAP_MC_PACKET_PROC_SECT_SECTION_A_RANGE_RANGE_1_GLOBAL_START 0x70002000
#define MMAP_MC_PACKET_PROC_SECT_SECTION_A_RANGE_RANGE_1_GLOBAL_END 0x70003FFF
```

Fig. 9c

```
//Section Section A, Address Addr_0
#define MMAP_MC_PACKET_PROC_SECT_SECTION_A_ADDRESS_ADDR_0_NAME "Addr_0"
#define MMAP_MC_PACKET_PROC_SECT_SECTION_A_ADDRESS_ADDR_0_TYPE
#define MMAP_MC_PACKET_PROC_SECT_SECTION_A_ADDRESS_ADDR_0_GLOBAL 0x70020000

//Section Section A, Address Addr_1
#define MMAP_MC_PACKET_PROC_SECT_SECTION_A_ADDRESS_ADDR_1_NAME "Addr_1"
#define MMAP_MC_PACKET_PROC_SECT_SECTION_A_ADDRESS_ADDR_1_TYPE
#define MMAP_MC_PACKET_PROC_SECT_SECTION_A_ADDRESS_ADDR_1_GLOBAL 0x70020004
```

Fig. 9d

Mem-Map Definition &
Linker Command file

```
//Section MAR1_Pools_DDR3
//Description: MAR1 Pool memory in DDR3
#define MMAP_TI_C6678_SECT_MAR1_POOLS_DDR3_SECTION_TYPE REGULAR_SECTION
#define MMAP_TI_C6678_SECT_MAR1_POOLS_DDR3_NAME "MAR1_Pools_DDR3"
#define MMAP_TI_C6678_SECT_MAR1_POOLS_DDR3_SIZE 204800
#define MMAP_TI_C6678_SECT_MAR1_POOLS_DDR3_TYPE "code/data"
#define MMAP_TI_C6678_SECT_MAR1_POOLS_DDR3_PERMISSIONS "RWX"
#define MMAP_TI_C6678_SECT_MAR1_POOLS_DDR3_SCOPE SCOPE_GLOBAL
#define MMAP_TI_C6678_SECT_MAR1_POOLS_DDR3_GLOBAL_START 0x8A000000
#define MMAP_TI_C6678_SECT_MAR1_POOLS_DDR3_NUM_RANGES 18
#define MMAP_TI_C6678_SECT_MAR1_POOLS_DDR3_NUM_ADDRESSES 0
```

1010

```
MMAP_TI_C6678_SECT_MAR1_POOLS_DDR3_SIZE 204800;
MMAP_TI_C6678_SECT_MAR1_POOLS_DDR3_GLOBAL_START = 0x8A000000;

SECTIONS
{
    MAR1_Pools_DDR3: { . += MMAP_TI_C6678_SECT_MAR1_POOLS_DDR3_SIZE;} run > \
    MMAP_TI_C6678_SECT_MAR1_POOLS_DDR3_GLOBAL_START, type = NOLOAD
}
```

1020

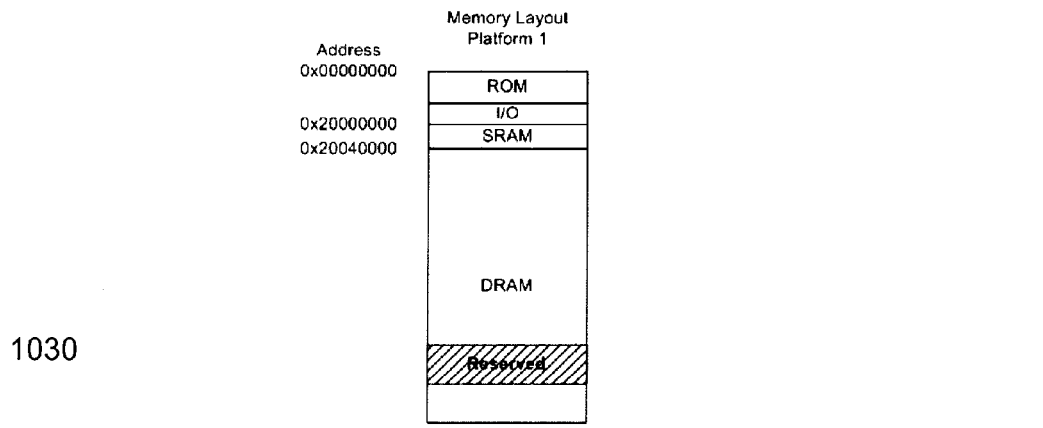

| Property | Value | |
|---|---|---|
| Location | Local | |
| Allocation | Address | |
| Address | MMAP_CROSS_PLATFORM_SECT_GLOBAL_POOLS_RANGE_CMB2_GLOBAL_START | 🖫 |
| Gate Key | GATE_CMB2 | |
| Allocation Size | 67840 | 🖩 |
| Caching | true | |
| Cache Alignment | 128 | |

| Link Driver: | Destination Node Parameters (N4) | | | |
|---|---|---|---|---|
| TIC66SMBDMALinkDriver | Name | Value | Type | |
| Link Subnet: | ← OutRemoteCoreId | 2 | out | |
| NET0 | ← OutSharedMemAddr | MMAP_CROSS_PLATFORM_SECT_LIN... | out | |
| Link Direction: | ← OutDMATriggerSize | 800 | out | |
| Bidirectional | ← OutGateId | LGID_N4_TO_N2 | out | |
| | → InNumQueueBufs | 4 | in | |
| Apply Changes | → InBufferSize | 2048 | in | |
| | → InMessagePool | POLY_COMBINED_POOL2_ID | in | |
| | → InSubPool | 0 | in | |
| | → InDataPool | POLY_POOL_ID_INVALID | in | |
| | → InWaiterPool | POLY_WAITER_POOL2_ID | in | |

Fig. 11h

Memory_Map_Multi_Platform_Linux.mmap ⊠ | filter_linux.pmap

Constants & Sections
∨ Add Section

Constants  Global_Pools  FILTER_1_0 ⊠  FILTER_1_1  FILTER_2_0  FILTER_2

Name: FILTER_1_0           Information: Arrays node 2 in DRAM

Scope: Global/Local ▼  Type: code/data ▼  Global Start: 0x7003C000

View:  ○ Local  ⊙ Global  Current Core: 2 ▼

| Range Name | Fixed | Reserved | Start Address | End Address | Size |
|---|---|---|---|---|---|
| Coefficient_0 | | | 0x7003C000 | 0x7003CFFF | 4096 |
| Coefficient_1 | | | 0x7003D000 | 0x7003DFFF | 4096 |
| Input_Array_0 | | | 0x7003E000 | 0x7003EFFF | 4096 |
| Input_Array_1 | | | 0x7003F000 | 0x7003FFFF | 4096 |

Fig. 11i

| Memory_Map_Multi_Platform_BIOS.mmap | filter_bios.pmap | | | | |
|---|---|---|---|---|---|
| Constants | Global_Pools | Local_Pools | Links | FILTER_1_0 | FILTER_1_1 |

Name: FILTER_1_0  Information: Arrays node 2 in SRAM

Scope: Global/Local ▼  Type: code/data ▼  Global Start: 0x12811900

View: ○ Local ● Global  Current Core: 2 ▼

| Range Name | Fixed | Reserved | Start Address | End Address | Size |
|---|---|---|---|---|---|
| Coefficient_0 | | | 0x12811900 | 0x128128FF | 4096 |
| Coefficient_1 | | | 0x12812900 | 0x128138FF | 4096 |
| Input_Array_0 | | | 0x12813900 | 0x128148FF | 4096 |
| Input_Array_1 | | | 0x12814900 | 0x128158FF | 4096 |

Fig. 11j

APPARATUS AND METHOD FOR PROVIDING A MULTICORE PROGRAMMING PLATFORM

CROSS-REFERENCE TO RELATED APPLICATIONS

This application claims the benefit under 35 U.S.C. §119(e) of the earlier filing date of U.S. Provisional Application No. 61/615,095 entitled "Apparatus and Method for Providing a Multicore Programming Platform" filed Mar. 23, 2012, the entirety of which is incorporated herein by reference.

BACKGROUND

Memory access is a primary limiting factor in computer performance. While processors have become faster, memory access times have not improved at the same pace. The growing number of computer elements, e.g. multicore processors and hardware accelerators, used to improve computer performance, are competing for access to the same memory, exacerbating this issue. To alleviate this widening memory access gap, memory architectures are evolving and becoming increasingly complex, e.g. multi level caches, local and global memories, and Network on Chip, Uniform Memory Architectures (UMA) or Non-Uniform Memory Architectures (NUMA).

Memory architectures are becoming more complex and different multicore platforms generally have different memory layouts. Multicore applications evolve from one version to the next, are complex and costly and must be portable to a multitude of platforms, with a minimum amount of modification. Managing the memory layout from the application leads to non-portable applications and suboptimal memory utilization. New methods providing a high degree of application portability and optimization are required to take advantage of memory architecture advancement.

Current methods for specifying memory are primarily based on memory segmentation controlled through linker commands, platform specific development and configuration tools and often referencing the memory layout directly "hard-coded" from within the application and other software. These methods are often compiler tool chain dependent, don't provide application portability and platform specific optimization is time consuming and costly.

Accordingly, current solutions are either architecture specific, therefore doesn't provide application portability, or don't provide a sufficient method for handling multicore computer memory, or both, leading to complexity and non-portability. There is a great need for new methods to handle complex multicore computer memory, in a portable manner.

SUMMARY

According to exemplary embodiments, a computer-implemented method for generating a memory map of a target computer includes specifying, from a plurality of identifiers stored in a memory of a host computer, at least one identifier associated with a memory layout of the target computer. The method further includes specifying a value associated with the specified at least one identifier. The method further includes generating a memory map definition of the memory map using the at least one identifier and the associated at least one value. The method also includes deploying software on the target computer, the software incorporating the memory map definition and including an executable instruction that references the at least one identifier which is replaced with the associated value.

According to exemplary embodiments, a host computer includes a memory and a processor. The processor is configured to specify, from a plurality of identifiers stored in the memory, at least one identifier associated with a memory layout of a target computer. The processor is further configured to specify a value associated with the specified at least one identifier. The processor is further configured to generate a memory map definition of the memory map using the at least one identifier and the associated at least one value. The processor is also configured to deploy software on the target computer, the software incorporating the memory map definition and including an executable instruction that references the at least one identifier which is replaced with the associated value.

According to exemplary embodiments, a non-transitory computer readable medium having executable instructions stored therein, which when executed by a processor of a host computer causes the processor to perform a method for generating a memory map of a target computer, the method. The method includes specifying, from a plurality of identifiers stored in a memory of the host computer, at least one identifier associated with a memory layout of the target computer. The method further includes specifying a value associated with the specified at least one identifier. The method further includes generating a memory map definition of the memory map using the at least one identifier and the associated at least one value. The method also includes deploying software on the target computer, the software incorporating the memory map definition and including an executable instruction that references the at least one identifier which is replaced with the associated value.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and their example depictions do not in any way limit the scope of the present advancements embraced by the specification. The scope of the present advancements embraced by the specification and drawings are defined by words of the accompanying claims.

FIGS. 5b and 5c illustrate an exemplary embodiments of memory map definitions.

FIG. 5d illustrates an exemplary embodiment of program code using the memory map definitions.

FIGS. 6b-6e-2 illustrate an exemplary embodiment of a topology map editor tool.

FIGS. 9b-9d illustrate an exemplary embodiment of a memory map definition.

FIG. 10 illustrate example excerpts from a generated memory map definition.

FIGS. 11a-11j illustrate an exemplary application of portable memory maps.

DETAILED DESCRIPTION

The present advancements described herein are directed to portable memory maps that can be ported to multiple multicore platforms.

Figure 1:
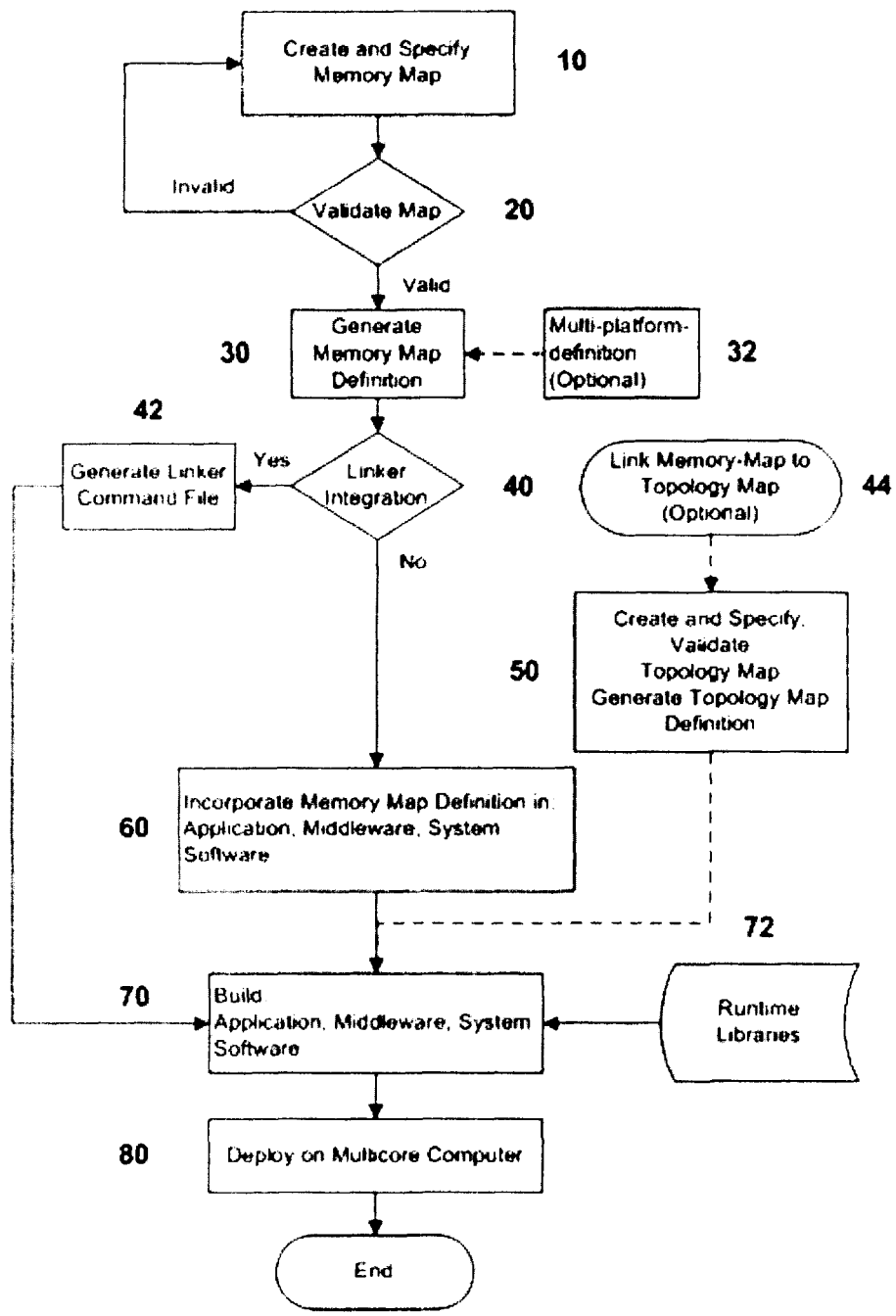
FIG. 1 illustrates an exemplary embodiment of a portable memory map deployment process.

The portable memory map method and apparatus, also referred to as memory map, provides fully portable memory map definitions and vastly simplified multicore platform specific memory layout and memory utilization, see FIG. 1. According to embodiments, the multiple cores in a multicore computer or platform may be on a single chip or on multiple chips. A memory map definition is generated from a user defined memory map. In some embodiments, a memory map definition includes symbolically defined values representing the memory map provided in descriptor file format. The descriptor file format is architecture tool and development tool independent. That is, the descriptor file format is compiler, assembler, and linker independent. In some embodiments, the memory map definition is symbolically referenced from the software and changes to the memory map result in regeneration of the memory map definition, without need for changes in the application or other software. As an example, two multicore systems may have similar memory maps, where some of the layout is exactly the same and other parts, such as the amount of SRAM and DRAM are different. An application that has multiple types of functionality, where one functionality may be emphasized on one system, and another type of functionality on a different system. The memory maps for each of the multicore systems may be defined differently in view of these differences for optimal memory utilization.

The portable memory maps provides abstraction between the application and other software and the multicore platform memory layout, enabling application portability between different platforms and rapid and iterative optimization of the platform memory utilization. With the portable memory maps, developers are provided application portability, reduced development and debugging, i.e. time to market, and optimal utilization of multicore platform memory. For example, telecommunications equipment providers often have several platforms, both internally developed and from acquisitions. The underlying multicore hardware platforms may be substantially different, both in terms of memory layout, processor types, and numbers. The telecommunications equipment providers have substantial investments in application (and system) software, typically modularized. The telecommunications equipment providers need to be able to use these modules in different combinations across the multitude of platforms, with little to no change, while still getting maximum memory utilization, i.e. performance out of each platform. Accordingly, the memory maps and corresponding memory map definitions disclosed herein provide the application portability required by the telecommunications equipment providers.

Portable Memory Maps

In some embodiments, in a portable memory map, a memory layout is structured and segmented into blocks or single locations, wherein each block and location is assigned an identifier and a value, i.e. a symbolic definition. The symbolic definitions can be referenced from the multicore platform software using the identifier. A memory map can be modified for optimization purposes or to accommodate multicore platforms with different memory layouts without requiring changes in the software (i.e., application, middleware, or system software) using the identifier. The symbolic definition does not need any modification to be used with existing platform specific memory layout tools and compiler development tools. Therefore, the symbolic definition provides multicore platform application portability.

As an example, Platform A may have a larger amount of high speed memory than Platform B, that may be used for performance critical computations. The memory map for Platform A may be designed or modified to allocate more of the high speed memory on Platform A compared to the memory map for Platform B. Accordingly, the memory maps for Platform A and Platform B would use the same identifier for the fast memory. However, the value of the identifier in each of the memory maps would be different to reflect the different memory sizes of the fast memory in Platforms A and B. Therefore, a single application may be developed that references the identifier for the fast memory. However, when this application is deployed on Platform A, the identifier for the fast memory relies on the memory map for Platform A, and when this application is deployed on Platform B, the identifier for the fast memory relies on the memory map for Platform B.

In another example, Platform C may have a larger amount of low power memory than Platform D that can be used to reduce power consumption. Accordingly, the memory map for Platform C may be designed or modified to allocate more of the low power memory on platform C with respect to the memory map for Platform D. Therefore, when an application is deployed on Platforms C and D and references the identifier for the low power memory, the value of the identifier is dependent on the respective memory maps for Platforms C and D.

According to some embodiments, a portable memory map has the following minimum requirements to provide multicore platform application portability and memory utilization, an identifier, a value, and a generated memory map definition. In additional embodiments, a portable memory map includes a multi-platform-definition containing platform specific values to automate generation of memory map definitions for a multitude of multicore platforms. As an example, a single memory map definition may include definitions for a first platform and a second platform. It is understood by one of ordinary skill in the art that memory map definitions are not limited to two platforms and may include definitions for any number of desired platforms.

An identifier and a value represent a symbolic definition. In some embodiments, the memory map definition contains the symbolic definitions for everything that has been specified in the memory map. The memory map definition is platform tools and compiler tools independent. In this regard, the symbolic definitions in a descriptor file are interpreted in a same manner by different compilers and therefore, don't require platform specific memory layout tools. A multicore computer memory layout is defined in a portable memory map, FIG. 3. By user input, constants are defined and memory is segmented, e.g. section, range and address, and specification of memory properties and attributes, e.g. type, access rights, addressing (physical, virtual) latency and bandwidth, power consumption. Examples of symbolic definitions used in portable memory maps are shown in Table 1. While Table 1 illustrates specific examples, one of ordinary skill in the art would understand that the embodiments discussed herein are not limited to Table 1.

In some embodiments, identifiers are predefined and stored in an identifier library. For example, terms such as section, range, and address are used by one of ordinary skill in the art in the context of memory layouts. Accordingly, a library of identifiers may be pre-loaded with these predefined identifiers. In additional embodiments, an application developer may create their own identifiers.

As an example, the categories: constants, sections addresses and ranges are predefined. The developer may create his/her own names of items in the memory map and identifiers are composed of a combination of the predefined categories and the developer provided names. The developer is free to chose their own names, i.e. there is no predefined identifier for SRAM. A predefined template memory map, containing, SRAM, DRAM, etc. could of course be provided for a platform.

Below is an example identifier:
MMAP_MC_PLATFORM_SECT_SRAM_GLOBAL_START,

The terms MC_Platform and SRAM are user defined. The term Global is system defined based on user input (i.e. global scope was selected). The remaining terms are generated, based on nomenclature.

| | | Portable memory map symbolic definition examples |
|---|---|---|
| Item | Description | Usage |
| Name | Name of the memory map | The name represented by an identifier and a value is used by software to reference the memory map from the multicore platform software, using the symbolic definition from the memory map definition, descriptor file. E.g. #define MMAP_MC_PLATFORM_NAME "MC_Platform" Where, The identifier is: MMAP_MC_PLATFORM_NAME The value is: "MC_Platform" |
| Description | memory map description | The description represented by an identifier and a value provide a more detailed description of the memory map. E.g. #define MMAP_MC_PLATFORM_DESCRIPTION "Multicore platform 1" Where, The identifier is: MMAP_MC_PLATFORM_DESCRIPTION The value is: "Multicore platform 1" |
| Constants | Specifies constants by name and value | Constants represented by identifiers and values can be used across a multitude of multicore platforms, and modified by value in one place, the memory map and reused by name in the software, across all the multicore platforms using the memory map definition. E.g. #define MMAP_MC_PLATFORM_CONST_BUF_SIZE 65536 Where, The identifier is: MMAP_MC_PLATFORM_CONST_BUF_SIZE The value is: 65536 |
| Sections | Specifies memory by name, key or address, size and attributes. Contains ranges and addresses | Sections represented by identifiers and values delineate a specified amount of memory starting at a certain address, representing physical memory (Regular Section), or at a to-be-defined address by the use of a key, used as an identifier, representing virtual memory (Named Shared Memory). Attributes and properties of the section are also specified. Sections can be used across a multitude of multicore platforms, and modified by value in one place, the memory map, and reused by name in the software, across all the multicore platforms using the memory map definition. E.g. #define MMAP_MC_PLATFORM_SECT_SRAM_GLOBAL_START 0x20000000 Where, The identifier is: MMAP_MC_PLATFORM_SECT_SRAM_GLOBAL_START The value is: 0x20000000 |
| Ranges | Specifies section memory by name, offset or address, size and attributes | Ranges represented by identifiers and values delineate specified amount of memory within a section. Ranges have a start address (physical memory) or an offset from the section start (virtual memory). Sizes are calculated, taking alignment into account and validated against the section size (overlap avoidance). Ranges can be used across a multitude of multicore platforms, and modified by value in one place, the memory map and reused by name in the software, across all the multicore platforms using the memory map definition. E.g. #define MMAP_MC_PLATFORM_SECT_SRAM_RANGE_BUFFER_1_SIZE 32768 #define MMAP_MC_PLATFORM_SECT_SRAM_RANGE_BUFFER_1_GLOBAL_START 0x20000000 |

| Portable memory map symbolic definition examples | | |
|---|---|---|
| Item | Description | Usage |
| | | #define MMAP_MC_PLATFORM_SECT_SRAM_RANGE_BUFFER_1_GLOBAL_END 0x20007FFF<br>Where,<br>The identifier is:<br>MMAP_MC_PLATFORM_SECT_SRAM_RANGE_BUFFER_1_SIZE<br>The value is: 32768<br>The identifier is:<br>MMAP_MC_PLATFORM_SECT_SRAM_RANGE_BUFFER_1_GLOBAL_START<br>The value is: 0x20000000<br>The identifier is:<br>MMAP_MC_PLATFORM_SECT_SRAM_RANGE_BUFFER_1_GLOBAL_END<br>The value is 0x20007FFF<br>In the above example, the starting address of the range is the second #define. Accordingly, since the start, end, and buffer size is known, the number of buffers within the range can be determined. |
| Addresses | Specifies section addresses (single locations) | Addresses represented by identifiers and values specifies single address locations in a section, e.g. an address used for an inter core mutex or device registers.<br>Addresses can be used across a multitude of multicore platforms, and modified by value in one place, the memory map and reused by name in the software, across all the multicore platforms using the memory map definition.<br>E.g.<br>#define MMAP_MC_PLATFORM_SECT_SRAM_ADDRESS_MUTEX_GLOBAL 0x20030000<br>Where,<br>The identifier is:<br>MMAP_MC_PLATFORM_SECT_SRAM_ADDRESS_MUTEX_GLOBAL<br>The value is: 0x20030000 |

According to some embodiments, a memory map definition is generated after the corresponding memory map is validated, e.g. no overlaps. In some embodiments, a memory map definition is provided in descriptor file format consisting of symbolically defined values representing the multicore platform memory layout. Examples of descriptor files are, C language .h header files, C++ language .hpp header files. A symbolically defined value consists of a name and a value (numerical or textual), e.g. #define MMAP_TI_C6678_SECT_MAR1_POOLS_DDR3_RANGE_MQP1_SIZE 1024, where MMAP_TI_C6678_SECT_MAR1_POOLS_DDR3_RANGE_MQP1_SIZE is the name and 1024 is the value.

Multicore software, e.g. application, middleware and system, uses the symbolic references, instead of manually specified (hard-coded) values, to query, and optimally control and use the memory as described above. According to some embodiments, the identifier is replaced with the value in the software at a compile time of the software. In other embodiments, the identifier is replaced with the value in the software after the compile time such as at time of use in the software execution (i.e., dynamic replacement). Below is an example linker command file excerpt including hard-coded values:

```
SECTIONS
{
  .text: load >> DDR3
  .stack: load > L2SRAM
  GROUP: load > DDR3
  {
    .bss:
```

```
    .rodata:
  }
  .data: load >> DDR3
  .L2RAMHeap1: load > 0x820000
}
```

In the above example, the linker command file, or other configuration file, would be manually edited to for example change 0x820000 to 0x870000 to place .L2RAMHeap1 at a different address. This change may need to be made manually for each platform in which the above linker file is deployed.

As illustrated above, manually specified values, whether specified in header files or directly in the program, would have to be modified and verified for every change, potentially in many places (source files), which is time consuming and error prone. In contrast to the embodiments disclosed herein, changes to the memory map values, e.g. a memory range address and size, result in regeneration of the corresponding validated memory map definition, wherein the symbolic names are unchanged and symbolic values are updated. Therefore, any application middleware, or system software referencing the symbolic name does not have to be changed. The abstraction provided by portable memory maps makes it convenient to the application developer to iteratively optimize memory utilization on a multicore platform and to port the same application to multiple platforms. In this regard, if one multicore platform has more fast SRAM than another, the software developer can easily find that out from the memory map definition and use more of it to speed up processing, and potentially reduce power consumption.

Memory map sections contain ranges and addresses, where a range is a block of memory and an address is a single memory location. According to some embodiments, size and memory alignment are specified for sections and ranges and boundaries are calculated and validated based on size and alignment. Sections can be typed "Named Shared Memory" or "Regular", covering both virtual and physical memory addressing. Regular sections can have "Local", "Global" or "Global/Local" scope, i.e. the memory referenced can be local to a core, visible for multiple cores or have both a local and a global address. Examples of memory attributes and properties are access rights (read/write/execute), type (code, data), power consumption management modes, read and write bandwidth, burst and sustained, location dependent read and write access latency, mode based power consumption, and scope based virtual and physical addressing.

Ranges can be automatically placed in a section or fixed at a certain address or offset from the range start and ranges can be reserved for specific purposes. Memory maps are defined and configured, and can be used independently of or in combination with for example C/C++ development tools, i.e. compiler/linker. According to embodiments, some memory map entries are validated upon entry and when a memory map is saved, it is validated against schematic exact model(s) (schema(s)) and validation rules, and warnings and errors if applicable are reported. Once the map is validated, and optionally a multi-platform-definition containing platform specific values is incorporated, a memory map definition, in descriptor file format, and optionally one or more linker command files are generated. The memory map definition contains all aspects of the multicore platform memory layout specified in the memory map, symbolically defined, and the linker command file(s) provide for convenient linker based integration with the target platform memory layout.

The memory map provides fine-grained, compiler/linker independent or combined, control of the memory specification, augmenting linker based memory segmentation methods. The granularity desired, is determined by the programmer. For example, linker command files typically refer to sections of memory, which are generally coarse grained blocks of memory, as follows:

```
SECTIONS
{
   .text: load >> DDR3
   .stack: load > L2SRAM
   GROUP: load > DDR3
   {
      .bss:
      .rodata:
   }
   .data: load >> DDR3
}
```

A memory map allows the user to quickly, and repeatedly slice the memory, e.g. sections, into fine, e.g. 256 buffers of 16 bytes each (by defining multiple ranges) grained blocks of memory, or individual addresses, 32 device registers. In this regard, a single large block of memory may be divided into smaller pieces (e.g., sections or buffers) as defined by application developer. To do the same with traditional methods would require manual editing. Multiple ranges or addresses may be easily added (or removed) (see FIGS. 4m and 4p-1.) By dividing large blocks of memory into smaller pieces, applications may store and retrieve information more efficiently by referencing the smaller pieces of memory, sized to the data being processed, instead of the large block of memory that the application needs to divide into smaller pieces.

The memory map definition can be used by topology maps (see below) and other system, middleware or application software, by referencing the symbolic definitions, on a multicore platform. In some embodiments, any changes in the memory map are validated and reflected in the generated header and optionally linker command files. Memory maps easily adapt to a family of multicore platforms with different memory specifications. Software using the symbolic references can therefore be applied to multiple multicore platforms and/or reconfigured memory layouts, without change. The validation and generation increases software consistency and reduces the risk for hard to find memory overlap errors.

Topology Maps

Topology maps provide an abstraction between an application and the underlying software and hardware of a multicore platform, for communication purposes. According to some embodiments, topology maps are used to define structure, attributes, properties and resources in a multicore communications topology containing multiple nodes and generation of topology map definitions. Attributes and properties include for example processor architecture and type, byte order, word length, number of nodes and cores, physical interconnects. As an example, a topology map includes a plurality of nodes interconnected to each other through communication links with each node configured to perform one or more functions of an application (see FIG. 11a).

According to some embodiments, resources used in topology maps may be organized in pools. Pools contain a predefined number of objects, organized and initialized based of the type of pool and its properties and attributes. Pre-allocated and initialized objects, at the desired memory location and alignment, increases performance and efficiency. For example, a free space of memory may be pre-allocated and configured as a resource pool for a topology map. Accordingly, when an application requires an allocation of memory, the portion of memory designated as the resource pool is unavailable to the application. The pre-allocation and configuration of memory for a resource pool permits the memory to be configured in a predefined way such that the application developer is able to optimally use memory.

Resources include for example message-, data-, message queue- and waiter-pools, repositories (for storage and management of messages) and inter-node links. As an example, a message contains metadata (in a header) and payload data. The metadata contains information, such as source and destination, size etc. and the payload carries the data to be processes by the application.

Below is a table illustrating the properties of example types of pools. It is understood by one of ordinary skill in the art the types of pools, and pool properties, are not limited to those specified in the table below.

| Pool types | | Example Properties |
|---|---|---|
| Combined | Combines message and data objects | With/without header, name, software/hardware managed, initialization node, MAR, location, allocation, shared memory key, address, gate key, allocation size, caching, cache alignment, waiter pool, data buffer size, number of sub-pools, buffers/sub-pool, pacing, watermarking |

-continued

| Pool types | | Example Properties |
|---|---|---|
| Message | Message objects | With/without header, name, software/hardware managed, initialization node, MAR, location, allocation, shared memory key, address, gate key, allocation size, caching, cache alignment, data pool, waiter pool, number of sub-pools, buffers/sub-pool, pacing, watermarking |
| Data | Data (payload) objects | With/without header, name, software/hardware managed, initialization node, MAR, location, allocation, shared memory key, address, gate key, allocation size, caching, cache alignment, data buffer size, number of data buffers |
| Message queue | Message queues objects, where messages are queued | Name, software/hardware managed, initialization node, MAR, location, allocation, shared memory key, address, gate key, allocation size, caching, cache alignment, pacing |
| Waiter | Waiter objects, used when a resource is not available, to wait for the resource to become available (like a rain check). | Name, software/hardware managed, initialization node, MAR, location, allocation, shared memory key, address, gate key, allocation size, caching, cache alignment, number of waiters, watermarking |

The core functionality of the creation of the Topology-Maps is disclosed in accordance with U.S. patent application Ser. No. 12/403,144 titled APPARATUS & ASSOCIATED METHODOLOGY OF GENERATING A MULTI-CORE COMMUNICATIONS TOPOLOGY, the entire contents of which are incorporated herein by reference. Resources may be local to a node or shared between two or more nodes in the multicore communications topology. Resource pools may be shared between nodes to optimize memory usage and to minimize data movement between nodes for performance optimization. Local resource pools can be used to optimize performance by minimizing data movement between applications and inter-node links and to separate data and meta-data, e.g. for integrity and security purposes. Resources may also be allocated based on specific memory location (distance from the processing element), attributes and characteristics.

In some embodiments, Memory Access Regions (MARs) are used to specify memory access boundaries. Entities, e.g. cores, nodes, pools, having direct access to, or belonging to, a MAR, i.e. members, can share the resources in the MAR. Entities with MAR association can belong to one or more MARs. A MAR can contain one or more members. For example processors, cores, nodes and resource pools can be associated with MARs (i.e. members), where they can directly access the same memory (Memory Access Region). For example, with respect to FIG. 2, a MAR specified in the shared memory 230 may be accessed by anyone of the processors included in the multicore system that are members of that MAR.

The type of resource, e.g. messages, message queues and waiters, is specified and properties are defined and configured. Properties, e.g. content, allocation type, location, management type (e.g. software, hardware accelerator), MAR association, initialization node, locking mechanism key, allocation size, data buffer size, alignment, caching mechanism, number of sub pools, number of buffers, are specified. A memory map definition may be referenced, by using the identifiers, i.e. symbolic definition, in the resource configuration providing multicore platform portability for the topology map resources. Resources, both general and multicore platform specific properties, are defined in the topology, and are validated against the schema(s) and validation rules either upon entry or when the topology map is saved. In some embodiments, once the resources are successfully validated, a topology map definition, one set of C (.c) and header (.h) and optionally other configuration files per node, is generated containing all aspects of the topology map.

Builder and Run-Time Libraries

According to some embodiments, builder and run-time libraries utilize the generated memory map definition and topology map definition. The memory map definitions include the necessary definitions, data structures, parameters and functions required to initialize and configure the memory and topology infrastructures at run-time. There are general run-time libraries used on all multicore platforms and architecture specific libraries, automatically selected by the programming platform builder, based on the node and link properties of the topology map, e.g. processor, OS and transport types. The generated node files (.c, .h and other), memory map definition, topology map definition, includes the multi-core platform memory layout description, data structures, specifications and initialization information required by the run-time libraries. The run-time libraries use the memory map definition and topology map definition for initialization, provisioning of memory and other resources, determination of related responsibilities of cores and other computer elements in the multi-core topology.

According to some embodiments, run-time resource management includes initialization, access, allocation, de-allocation, locking, releasing and scheduling. The separation and automatic selection of general and platform specific libraries provides for application portability across a wide range of multicore platforms. In the combination of the runtime libraries and a generated multicore topology, the runtime libraries can be thought of as providing certain functions "without personality", i.e. they will be performed the same way regardless of where they were invoked from. The memory map definition and topology map definition provides the "personality" by providing definitions, configuration and parameters that are processor, core, node and link specific. An application can therefore be multicore enabled once by encapsulating functions with communications primitives. Alternative mappings of the application to the underlying multicore platform can then be accomplished by modification of the memory map and the topology map, without modifying the application again. This separation provides a high degree of application portability and optimization capability.

A portable memory map may also include a multi-platform-definition containing platform specific values to automate generation of memory map definitions for a multitude of multicore platforms.

FIG. 1 shows an embodiment of the portable memory map deployment process. The process generally starts at step 10 where a memory map is created and specified. In step 20 the memory map is validated against a predetermined schema(s) and other predetermined validation rules. According to some embodiments, the schemas are predetermined (part of the tools) and used by the tools to validate certain aspects (structure, value ranges) and other validation rules, e.g. boundary calculations, relationships and interactions between, various objects in the memory map are designed into the tools. The schemas may be stored as a file in memory and accessed by the tools for validation of a certain aspect of a memory map.

If the validation shows errors, the process returns to step 10 to correct the memory map. Once the memory map passes validation, the process proceeds to step 30 where a memory map definition is generated. In alternative embodiments, the process includes step 32 where an optional multi-platform-definition containing platform specific values is incorporated.

The process proceeds to step 40 to determine if linker command files are to be used. If the linker command files are to be used, the process proceeds to step 42 to generate the linker-command files. As an example, when it is known a priory that a part of the memory is unused by hardware or software, other than the software using the memory map definition, that part of the memory can be used without linker integration.

In alternative embodiments, the process includes step 44 where a memory map may optionally be linked to a topology map. If the memory map is to be used in combination with a topology map, the process proceeds to step 50 to create, specify, and validate the topology map. According to some embodiments, the topology map is created, specified and validated as disclosed in accordance with U.S. patent application Ser. No. 12/403,144 titled 20100235847-A1, APPARATUS & ASSOCIATED METHODOLOGY OF GENERATING A MULTI-CORE COMMUNICATIONS TOPOLOGY.

If the linker command files are not to be used, the process proceeds to step 60 where the resulting memory map definition is incorporated, by the developer, in the multicore computer software. This incorporation may be performed manually by the developer. The process proceeds to step 70 where the software is built (i.e., compiled) using the memory map definition, runtime libraries and if applicable, topology map definition and linker command files. The process proceeds to step 80 to deploy the software on the multicore computer 80. In some embodiments, the process illustrated in FIG. 1 terminates at step 80.

Figure 2:
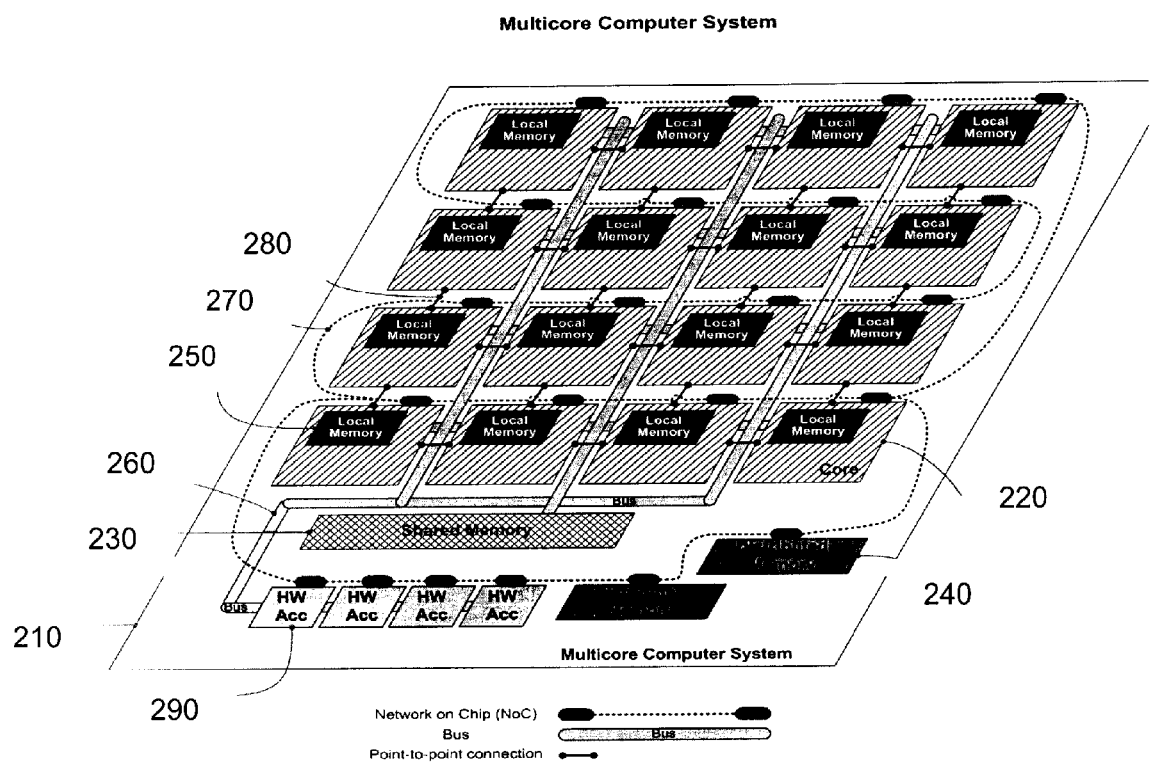
FIG. 2 illustrates an exemplary embodiment of a multicore computer system.

FIG. 2 illustrates an embodiment of a multicore computer system 210 including multiple cores 220, memories, hardware accelerators and interconnects. The multiple cores may span on one or more chips. Each chip may have one or more cores/processors. The system has directly shared memory 230, distributed shared memory 240, and each core has local memory 250, e.g. cache, scratch pad, and multiple types of interconnects, bus 260, network on chip (NoC) 270, and point-to-point interconnections 280 between neighboring cores. The local memory, shared memory and interconnects may have different attributes and properties, e.g. type, size, bandwidth, latency (type and location based), coherency, power consumption and reliability. In some embodiments, hardware accelerators 290 are functions implemented in hardware for the purpose of performing functions faster than is possible in software running on a general purpose processor. Hardware accelerators are used for different purposes, such as data sharing, e.g. Direct Memory Access (DMA) and queue managers, and algorithm acceleration, e.g. video compression/decompression, packet processing.

Figure 3:
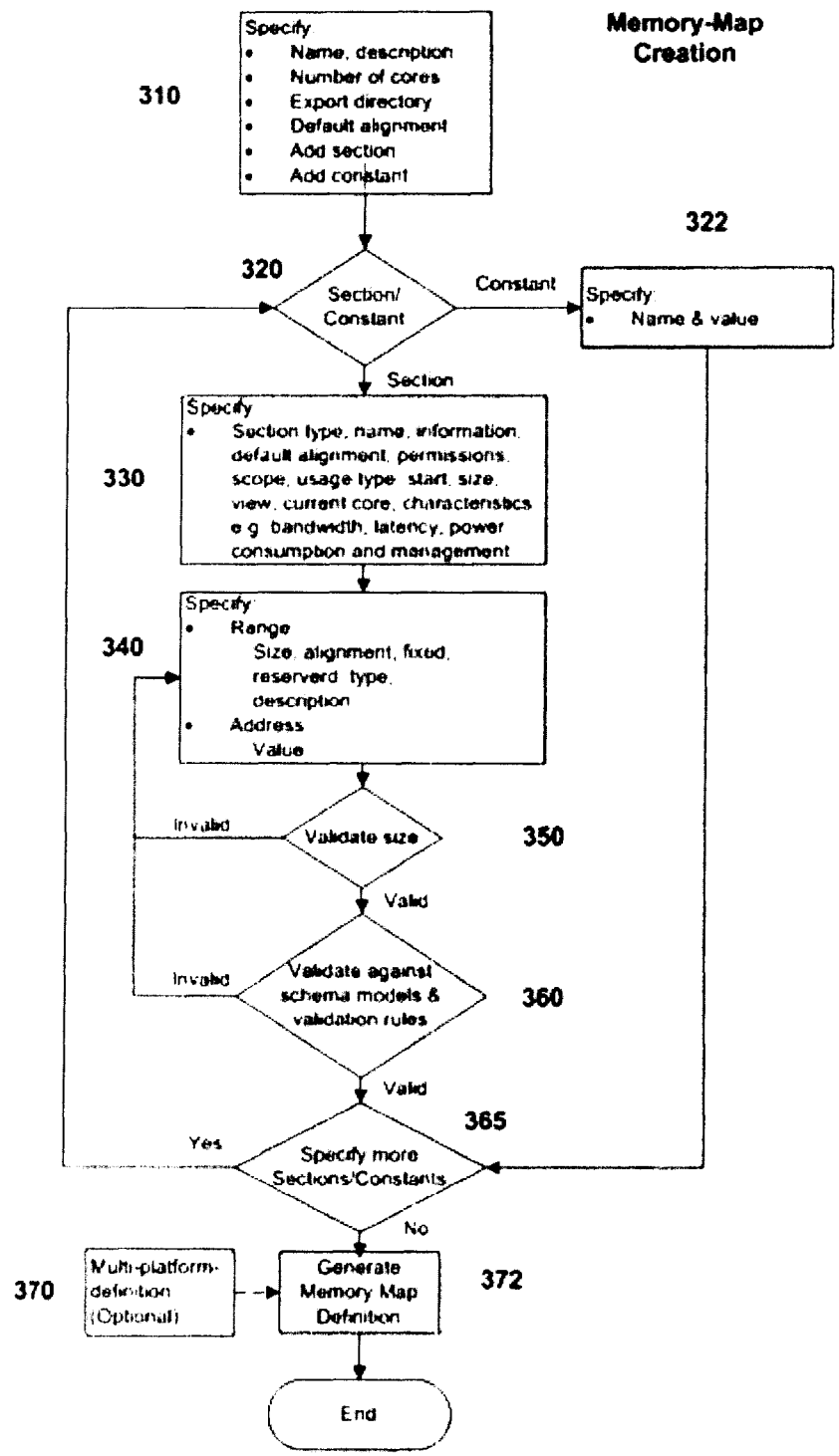
FIG. 3 illustrates an exemplary embodiment of a process for creating and validating a memory map.

FIG. 3 illustrates an embodiment of a process for creating and validating a memory map. In some embodiments, the process illustrated in FIG. 3 corresponds to steps 10 and 20 in FIG. 1. The process illustrated in FIG. 3 generally starts at step 310 where the memory map name, description, number of cores, export directory and default alignment are specified. Sections and constants are also added in step 310.

The process at 320 determines whether a section or constant is being specified. If a constant is being specified, the process proceeds to step 322 where constants are specified by name and value. The process proceeds to step 365 to determine if there are more sections or constants to be specified. If there are more sections or contents to be specified, the process returns to step 320, otherwise the process proceeds to 372.

If a section is being specified, the process proceeds to 330 where the sections are specified by type, name information, default alignment, permissions (RWX), scope (Global/Local, Local, Global), usage type (Code, Data) start or offset, size, view (multiple cores), current core, and characteristics e.g. bandwidth, latency, power consumption and management. The process proceeds to step 340 to specify a range and address of the section. Particularly, in some embodiments, sections contain addresses representing a single location in memory and ranges representing a block of memory with certain properties. In some embodiments, a range is specified by size and alignment, resulting in a total size which determines the start of the next range. A range can be reserved and fixed. A reserved range indicates that the range should not be used. If a range other than the last range in a section is deleted, memory is compacted towards the beginning of the section. A fixed range, however, will remain at the same address and not be rearranged. Below is a table that illustrates an embodiment of section attributes and properties.

| Section Attributes and Properties | |
| --- | --- |
| Default Alignment | Default alignment used when crating ranges |
| Permissions | R—Read, W—Write, X—Execute |
| Scope | Global, Local or Global/Local. Certain memory, for example a cache may have a core local scope (address), visible only to that core and a global scope (different address) visible to all cores (on a chip). |
| Type | Code, Data, Code/Data |
| Global Start | Start address for global scope |
| Local Start | Start address for local scope |
| Size | Size of the section. |
| Performance characteristics | |
| Memory Clock | Clock speed |
| Latency | Access time, read write. This may be different for different cores or the same for all cores. |
| Transfer Rate | Read, write, burst and sustained. Burst is for a certain size transfer. |
| Power Consumption | There may be different power modes with different power consumption. |

It is understood by one of ordinary skill in the art that the section attributes and properties are not limited to those illustrated in the above table and may include any desired attribute or property specified by an application developer.

The process proceeds to step 350 to validate the total range size and against the size of the section. If the total range size is invalid, the process returns to 340 to correct the total range size. If the total range size is valid, the process proceeds to step 360 to validate the memory map. As an example, when the memory map is saved, it is validated against the schema(s) and validation rules. If the memory map fails validation, process flow returns to step 340 for correction. Once the memory map passes validation, process flow proceeds to step 365 to determine if there are any more sections or constants to be specified. If there are no more sections or constants to be specified, the process proceeds to step 372 to generate the memory map definition. In further embodiments, the process includes an optional step 370 for incorporating a multi-platform-definition containing platform specific values. As an example, two different platforms may have similar memory layouts with different section starting addresses and sizes. The starting addresses and sections may be automatically inserted in the memory map definition, producing multiple memory map definitions with the same internal structure of ranges, at different locations.

According to some embodiments, the memory map definition is provided in descriptor file format including symbolically defined values representing the memory map. The descriptor file format is independent of architecture specific memory layout tools and development tools (compiler, assembler and linker). The memory map definition is symbolically referenced from the software and changes to the memory map result in regeneration of the memory map definition, without need for changes in the application or other software. The portable memory maps provides abstraction between the application and other software and the multicore platform memory layout, enabling application portability between different platforms and rapid and iterative optimization of the multicore platform memory utilization.

Figure 4A:
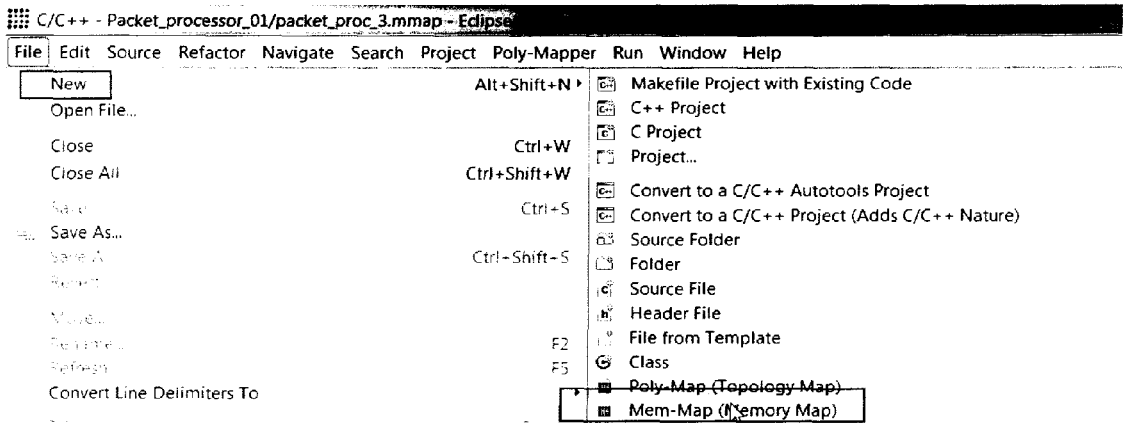
FIGS. 4a-4t illustrates an exemplary embodiment of a memory map editor tool.
Figure 4C:
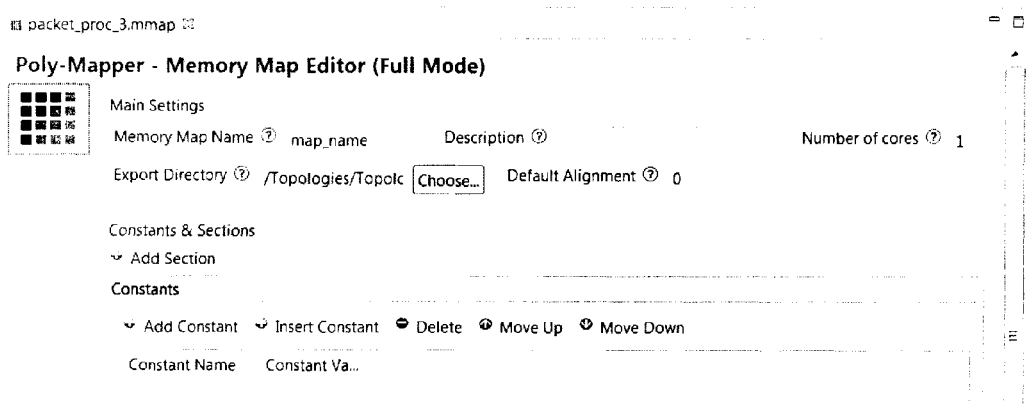
Figure 4B:
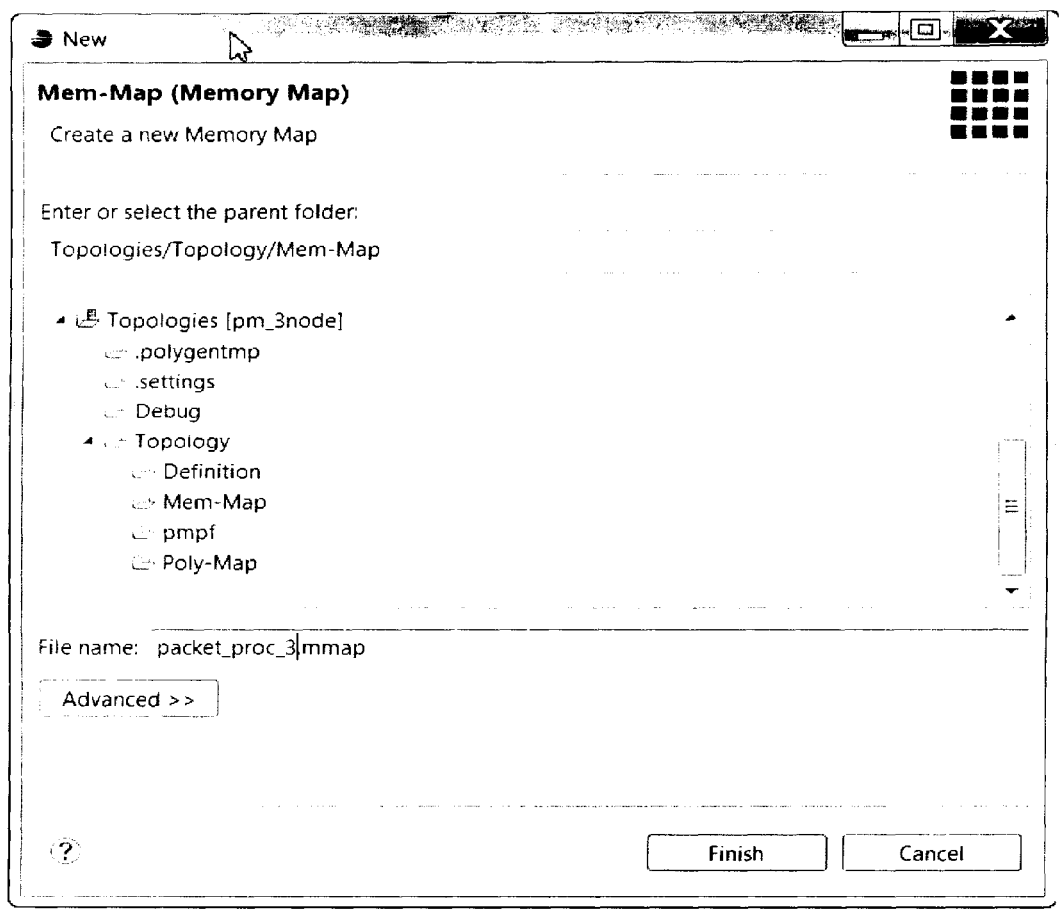
Figure 4D:
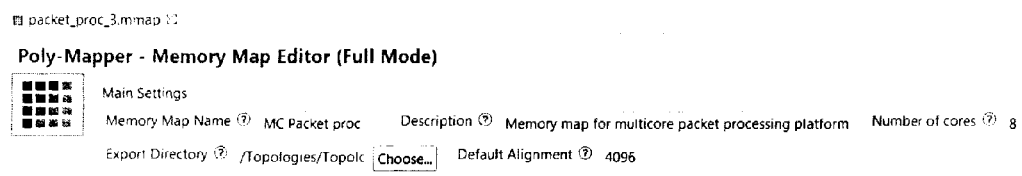

FIGS. 4a to 4t illustrate exemplary embodiments of an editor tool to create a memory map. As illustrated in FIG. 4a, an application developer may open up a new window and specify that a new memory map should be created. The developer may give the memory map a file name and location as illustrated in FIG. 4b. In some embodiments, the editor tool includes a memory map wizard for defining constants and sections in the memory map as illustrated in FIG. 4c. In the memory map wizard, the memory map name, description, and other map wide information is entered as illustrated in FIG. 4d. FIG. 4e illustrates example constants specified in the memory map editor. Constants, e.g. commonly used buffer size, and number of buffers, are added. The constant values may be modified, without changing the software using the symbolic identifier. For example, as illustrated in FIG. 4e, constant values for different buffer sizes and number of buffers are added.

Figure 4H:
Figure 4I:
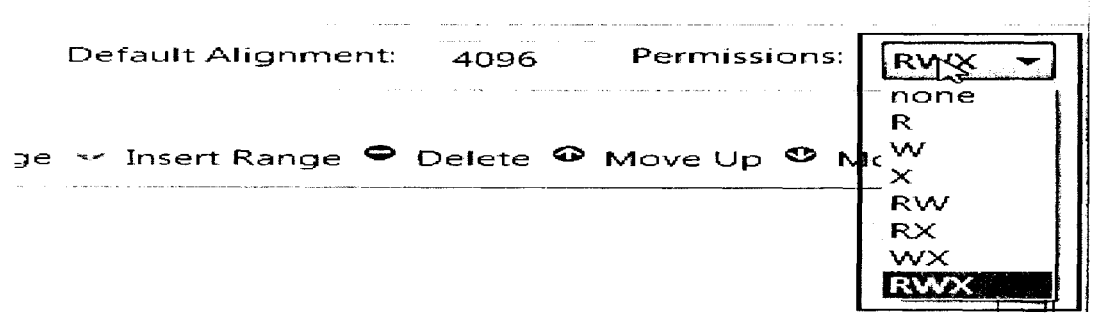
Figure 4J:
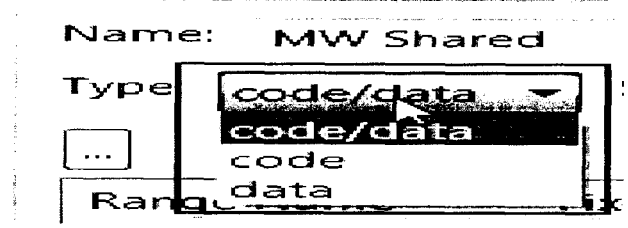

The editor tool further allows the developer to add and define sections. For example, FIG. 4f illustrates that a section designated as a regular section, representing physical memory, is added. As illustrated in FIG. 4g, the section name, description start address(es) and size are entered. The developer may further specify the section scope. As an example, as illustrated in FIG. 4h, the section of scope may be specified as Global/Local (global and core local), Global (to all cores), or Local (to the "Current Core"). Permission attributes are specified (e.g., read/write/execute) as illustrated in FIG. 4i. Type attributes are further specified in FIG. 4j.

Figure 4K:
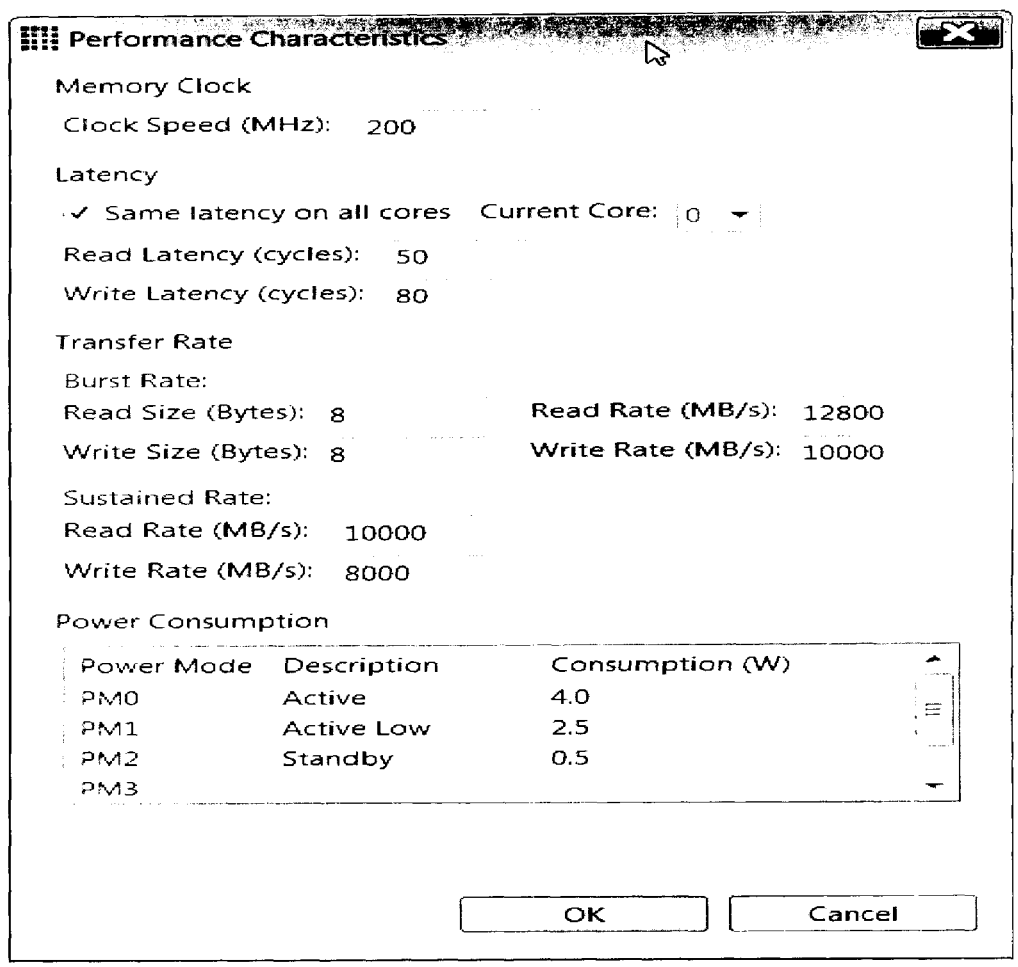
Figure 4I:
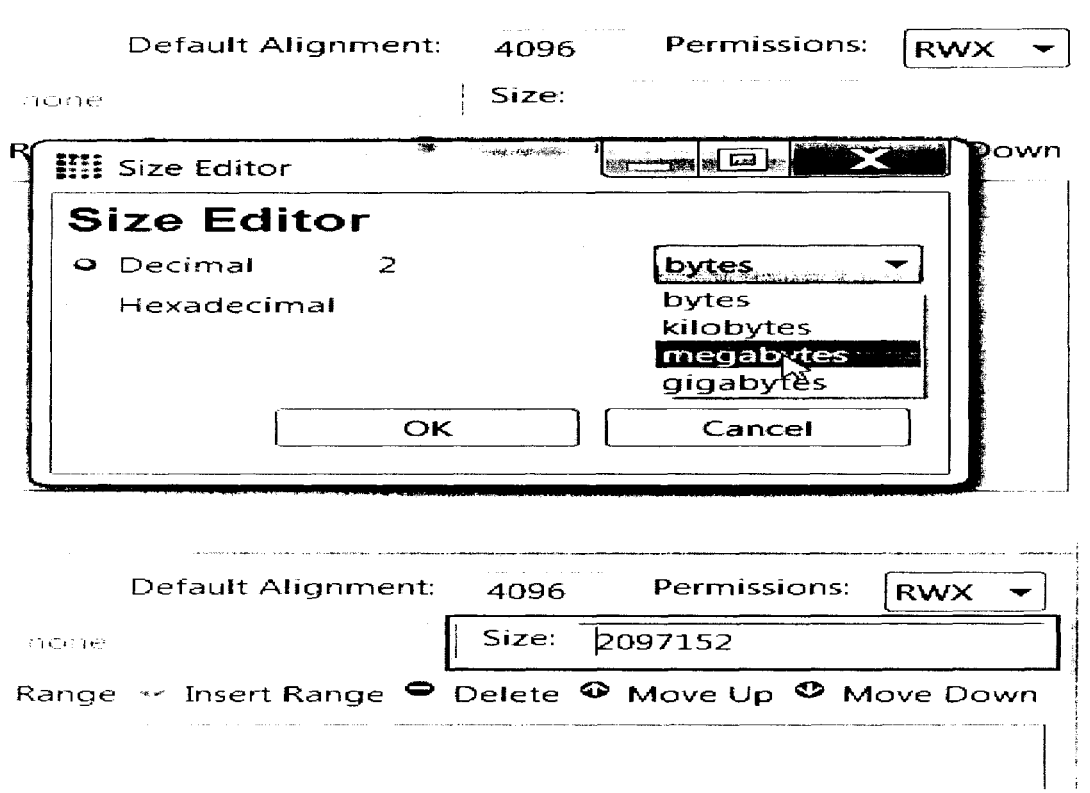

FIG. 4k illustrates an example for specifying performance characteristics. The performance information may be used by the application or other software to determine if the memory section performance meet the application requirements. As an example, an application may exist from a previous generation product that is adapted to the next generation. The previous product may not have been efficiently utilizing memory, or may have done this in a hard coded manner, in which case using a memory map would improve the situation and provide forward application portability. This would involve creating a memory map and adapting the application to incorporate the definition. When the next-generation application is created, the developer may use the memory map editor to create the memory map using the application requirements from the previous generation product.

Figures 4M, 4N:
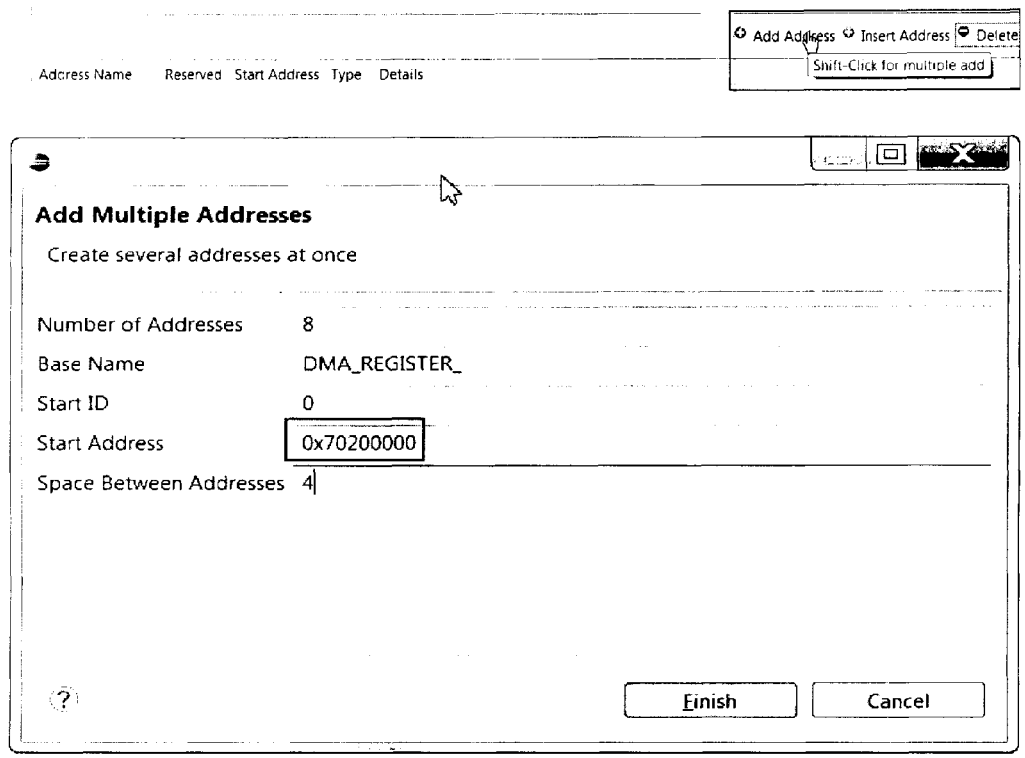

The section size is specified as illustrated in FIG. 4l, and multiple section addresses may be specified as illustrated in FIG. 4m. For example, as illustrated in FIG. 4m, a developer specified eight addresses for a section along with a space between the addresses and the starting address. FIG. 4n illustrates the eight different addresses along with the starting address and an ending address for the eighth address.

Figures 1, 2, 4O:
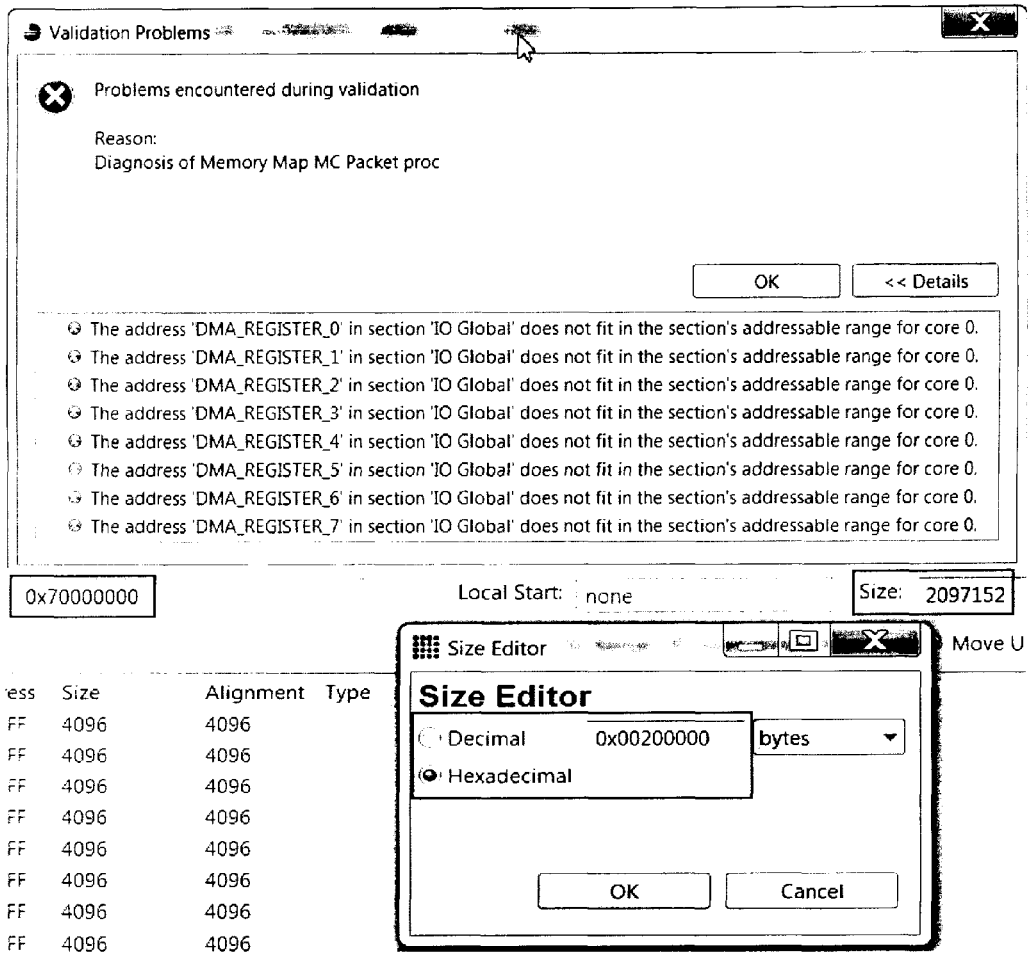
Figures 3, 4O:
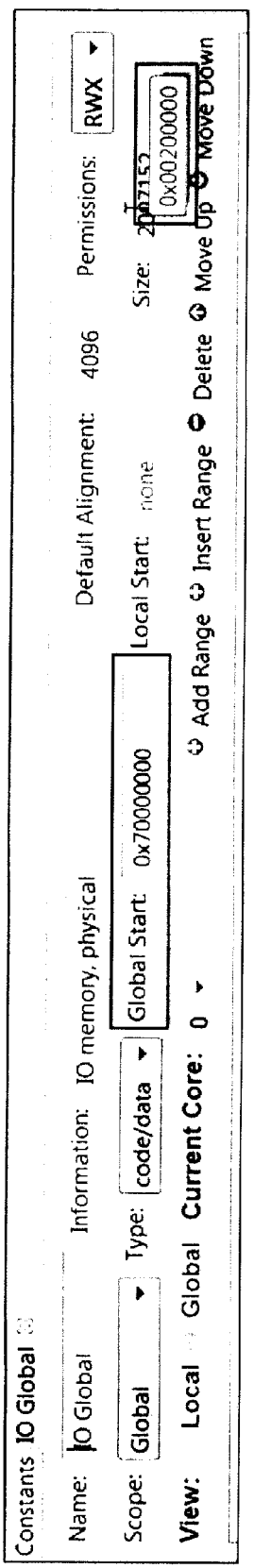

The editor tool, in some embodiments, further permits the application developer to perform memory map validation. For example, FIG. 4o-1 illustrates errors that occurred during map validation. For example, memory map validation shows that the addresses specified are outside of the memory section boundary, which is at 0x701FFFFF. This boundary is determined by the section starting address at 0x70000000 (FIG. 4o-3) and the section size 2 megabytes (i.e., 2097152 bytes or 0x00200000, hex). The boundary is the addition of section start and size, 0x70000000+(0x00200000−1)=0x701FFFFF. This boundary is calculated by the memory map editor tool. In FIG. 4o-2, the address is appropriately modified and passes validation.

Figures 1, 2, 4P:
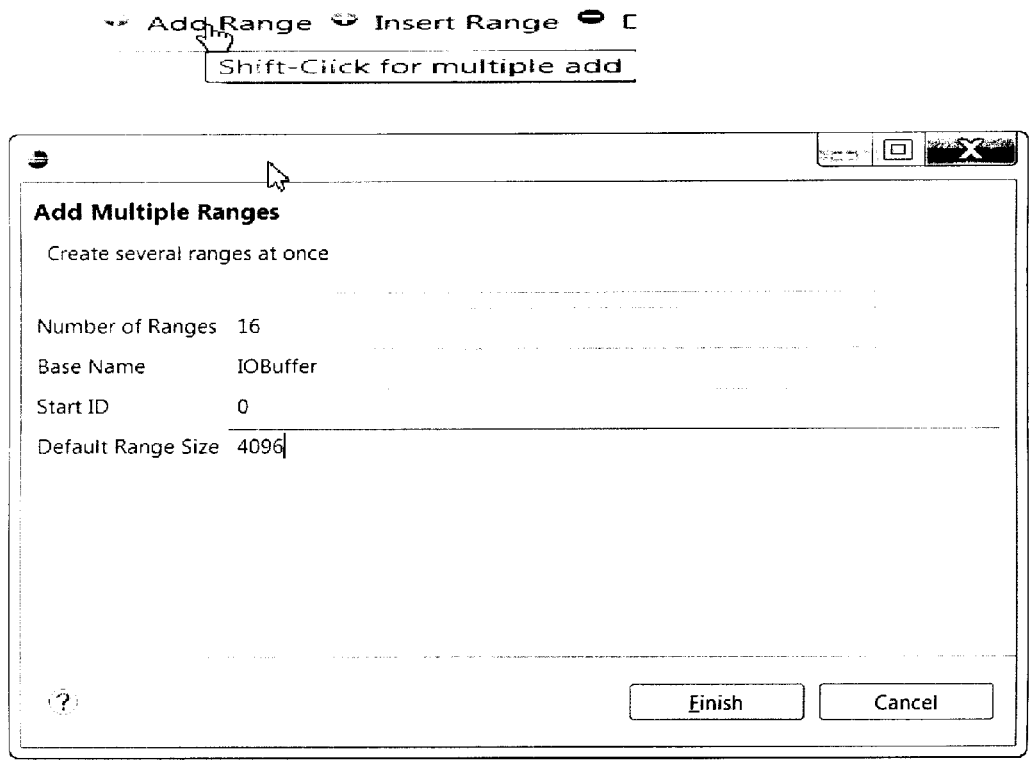
Figure 4S:
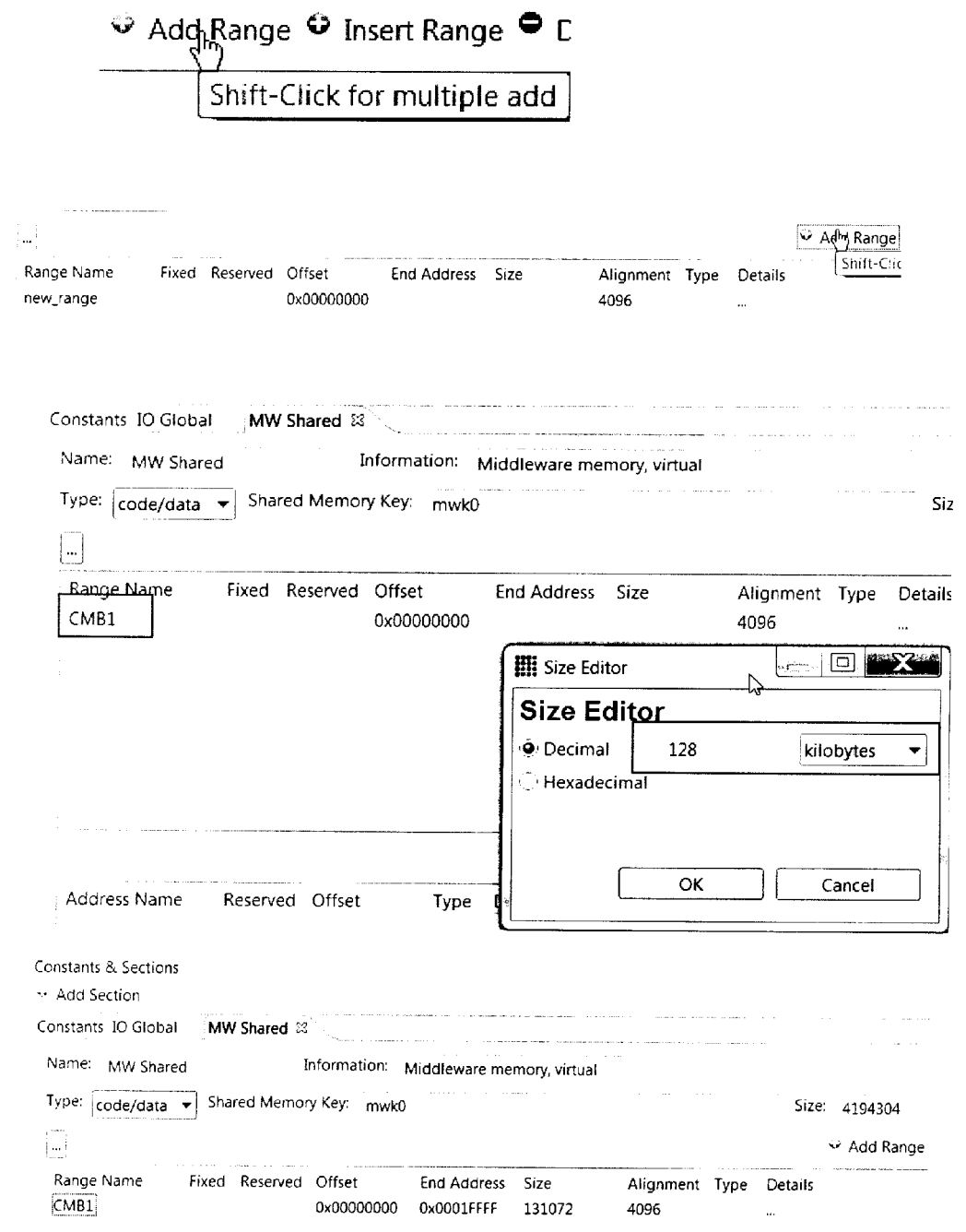
Figure 4T:
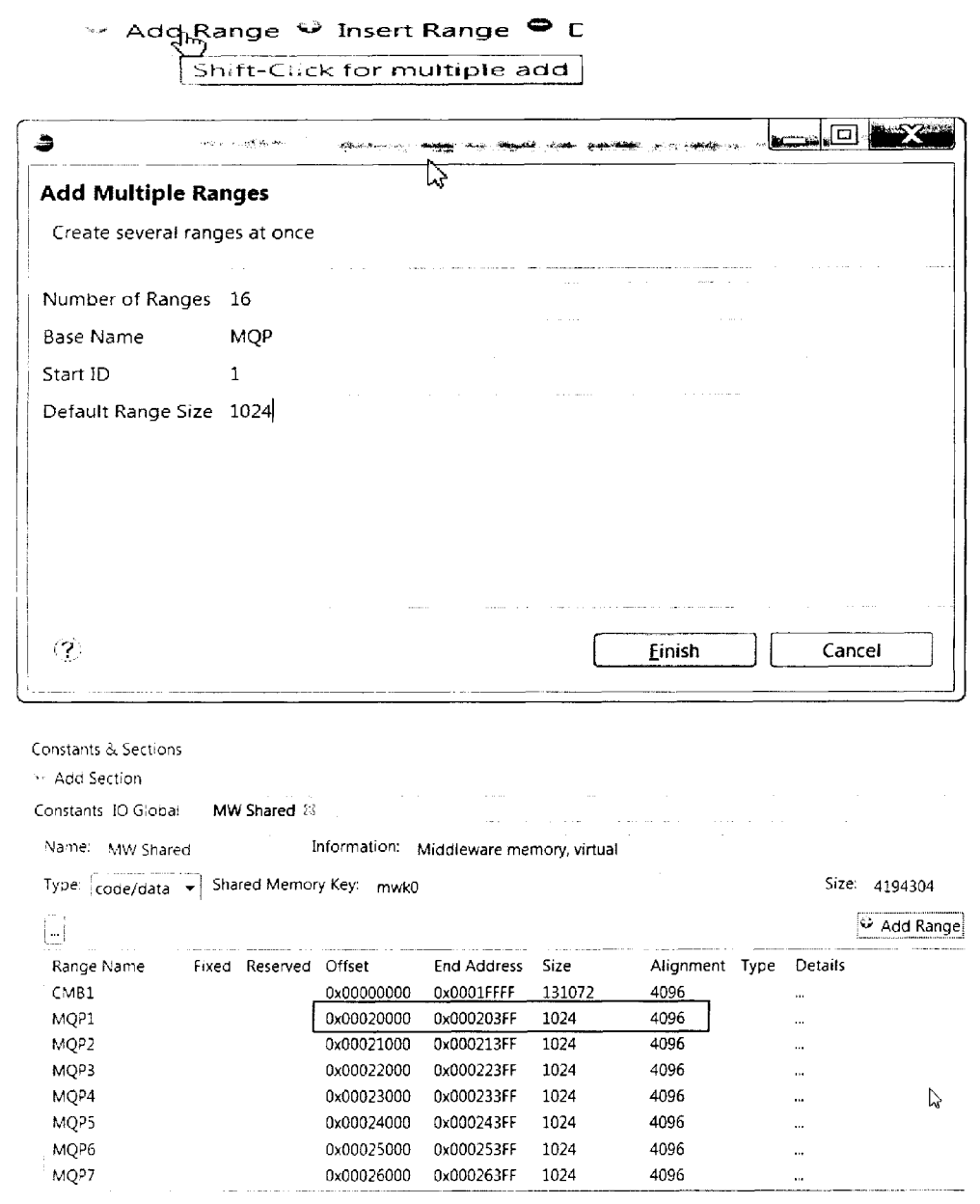

FIGS. 4p-1 and 4p-2 illustrate adding multiple ranges for a section. In some embodiments, the ranges are automatically arranged, aligned, sized, and validated against a section boundary for potential overlapping. In FIG. 4q, section memory is compacted if ranges other than the last are deleted. Ranges may be fixed, e.g., remain at its specified address, even if ranges above (at lower addresses) are removed. Ranges may also be reserved, e.g., not to be used by the application.

FIG. 4r illustrates adding a named shared memory section representing virtual memory. FIG. 4s illustrates adding a range to the named shared memory section. A virtual section, in some embodiments, uses offset addresses that are relative to a virtual address as determined runtime with use of a key. According to some embodiments, a key is a unique named shared memory identifier specified by the user. As an example, a key is an identifier in a memory map having a string of characters as a value. An example identifier for a key may be mwk0 (short for middleware key 0, "Shared Memory Key," see FIG. 4s). The key is used by the runtime software by the entities (i.e., core, process) sharing the memory to identify the memory. The key has to be unique since the key is used by the entity to identify the named shared memory section. In this regard, the key is mapped to a specific named shared memory section. For example, if a first entity and a second entity need to access the same named shared memory section, both the first and second entities need to provide the key associated with the named shared memory section to access the named shared memory section.

FIG. 4t illustrates an example of adding multiple ranges.

Figure 5A:
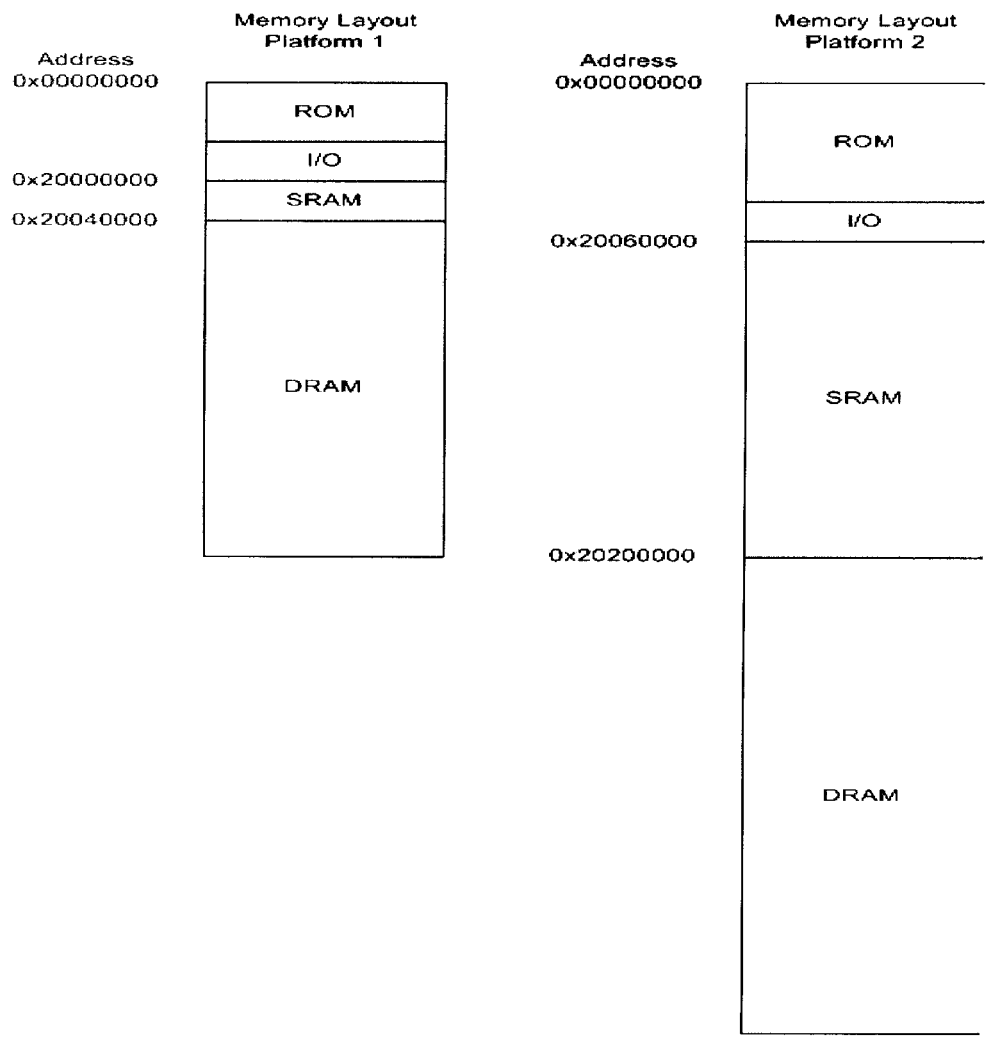
FIG. 5a illustrates example memory layouts for two different multicore computer platforms.

FIG. 5a illustrates example memory layouts for two different multicore computer platforms. In this example, the different multicore computer platforms contain the same types of memory (e.g., ROM, I/O, SRAM, DRAM, etc.), but at different address locations and with different sizes. FIG. 5b shows excerpts of the corresponding generated memory map definition for multicore platform 1. FIG. 5c shows excerpts of the corresponding generated memory map definition for multicore platform 2. Platform 2 has more available fast SRAM, which can be used to speed up processing on that platform. FIG. 5d shows example program code, utilizing the symbolic definitions from the memory map definitions, which can therefore be used on both multicore platforms, unchanged. In this regard, without the memory map definitions, an application developer would need to write two separate pieces of code or more complex code for the same application with the identifiers in the memory map definitions replaced with hard-coded values specific to the memory layouts for Platform 1 and Platform 2. Thus, the memory map definitions permit the application developer to write the application once that can be used on both Platforms 1 and 2.

Figure 6A:
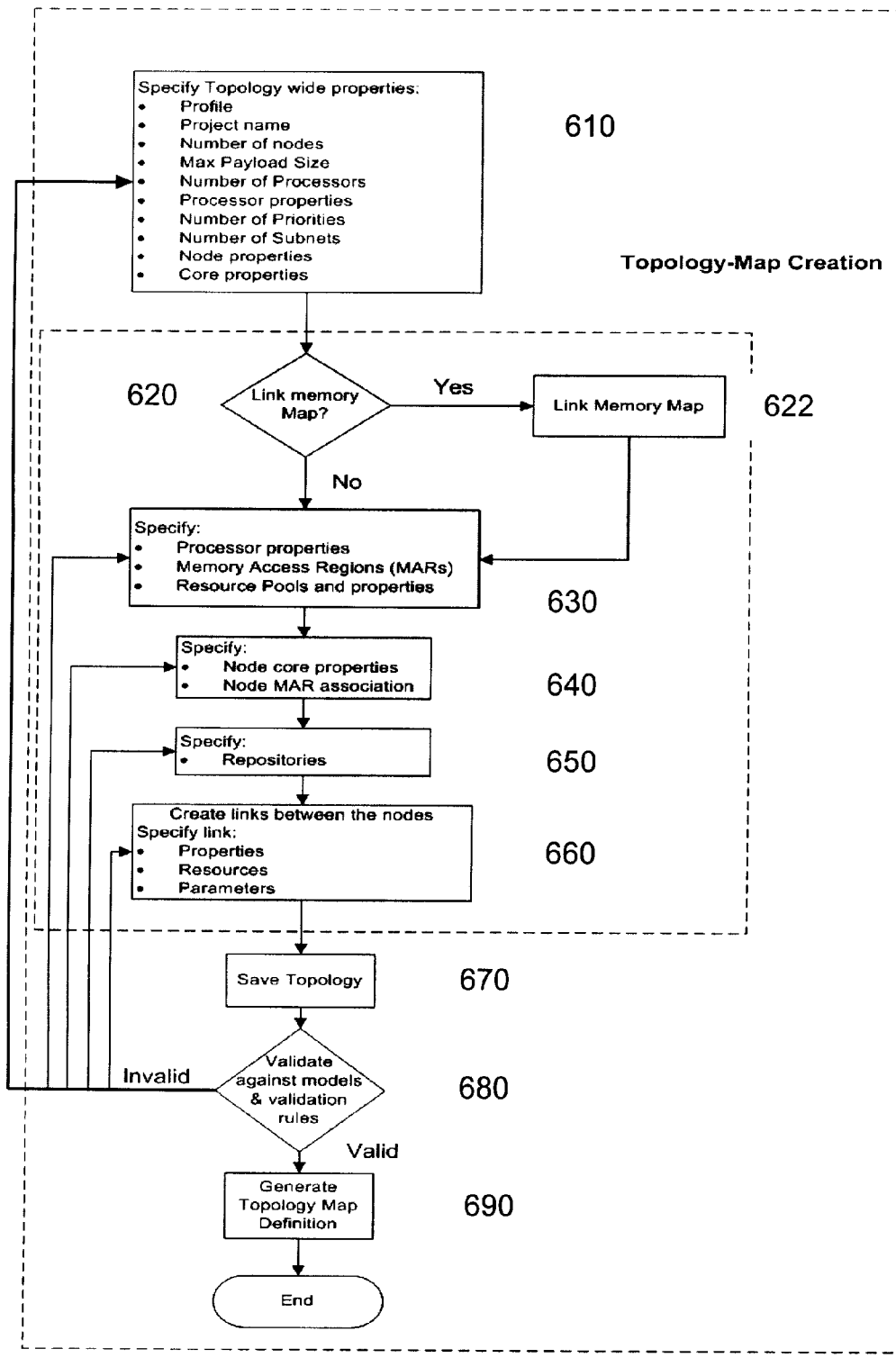
FIG. 6a illustrates an exemplary embodiment of a process for creating a topology map.
Figure 6B:
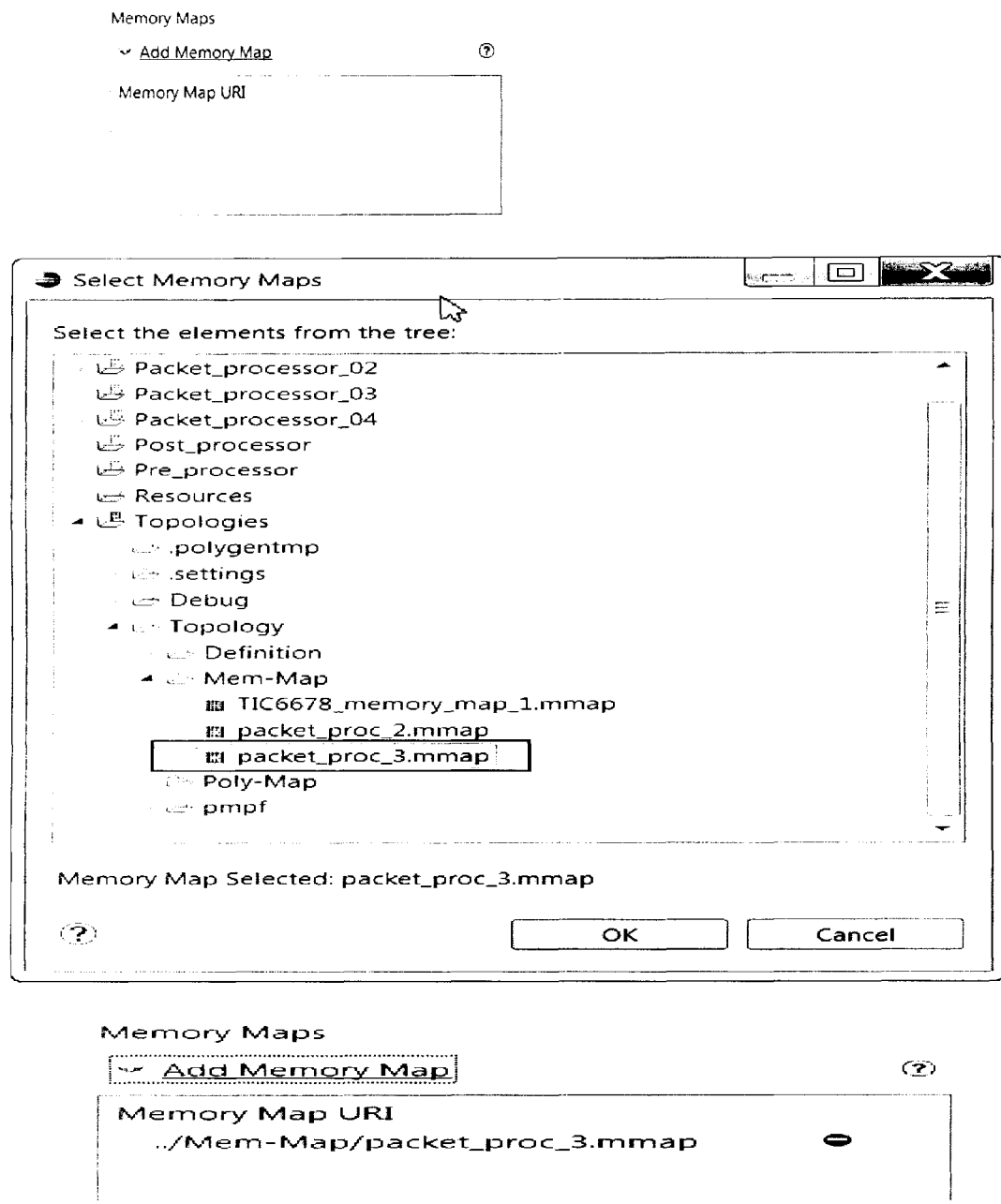

FIG. 6a illustrates an embodiment of a process for the creation of a topology map, which optionally incorporates a memory map. Steps 610 and 670-690 are disclosed in the topology map creation as disclosed in U.S. patent application Ser. No. 12/403,144 titled APPARATUS & ASSOCIATED METHODOLOGY OF GENERATING A MULTI-CORE COMMUNICATIONS TOPOLOGY. Topology wide properties, such as profile, project name, number of nodes, max payload size, number of processors, processor properties, number of priorities, number of subnets, node properties and core properties are specified in step 610. In step 620, the programmer decides whether to link a memory map to the topology map, or not. If the memory map is to be linked to the topology map, the process proceeds to 622 to link Memory-Map to the Topology-Map (FIG. 6*b*). A linked memory map can be referenced for specification and configuration of optimal memory use in the topology.

The process proceeds from steps 620 and 622 to step 630 to specify processor properties, MARS, and resource pools. Processor properties (e.g. architecture, number of cores, word length, byte ordering), MARs are defined as local or shared and configured, memory sections may be linked to MARs, and resource pools are defined by type and content and configured. The process proceeds to step 640 to specify node core properties and MAR associations. As an example, node core properties include node locations (processor, core), operating system (OS), type (master, regular). The process proceeds to step 650 to specify repositories. The process proceeds to step 660 to create links between the nodes and specify link properties, resources, and parameters. It is noted that once the memory map is linked in step 622, the memory map may be accessed in steps 630-660.

The process proceeds to step 670 where the topology-map is saved. The process proceeds to step 680 where the topology-map is validated against schema models and validation rules. If the topology-map is invalid, warnings and errors are reported to the user and the process returns to step 610. The user can go back and modify the topology map based on the validation feedback. When the topology map is valid, the process proceeds to step 690 to generate a topology map definition.

Figures 1, 2, 6C:
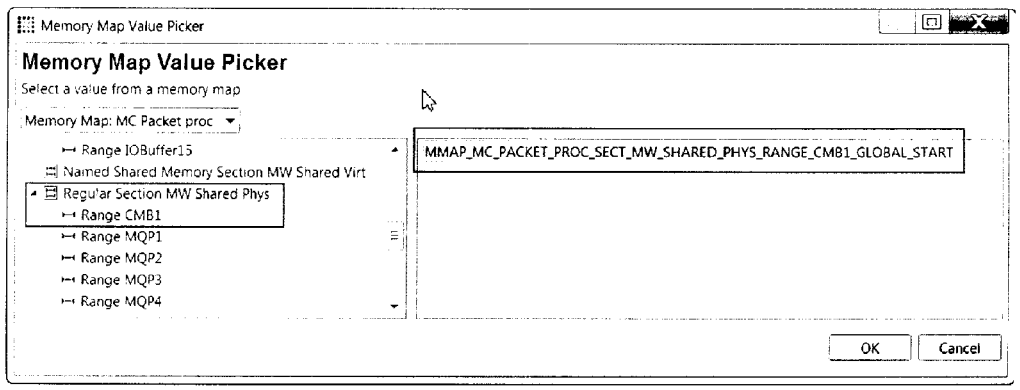
Figures 2, 6E:
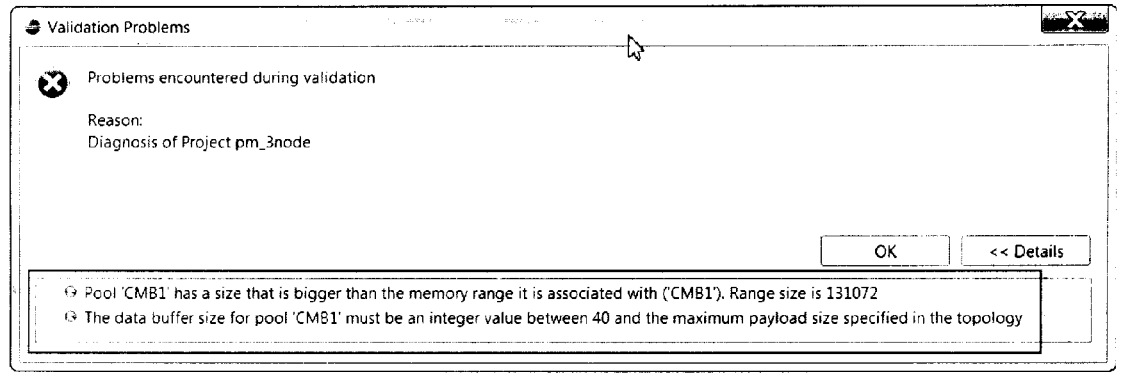

FIGS. 6*b*-6*e*-2 illustrate an embodiment of a topology map editor tool. As illustrated in FIG. 6*b*, a user may use the editor tool to link a memory map to a topology map. As illustrated in FIG. 6*c*-1, upon selection of the "MEM" button, a memory map address is used in a topology map for allocation of a Combined Pool. FIG. 6*c*-1 illustrates examples of items defined in a resource pool. In FIG. 6*c*-2, an identifier is selected from the memory map and a corresponding value is provided. As illustrated in FIG. 6*d*, the corresponding memory map identifier (MMAP_MC_PACKET_PROC_SECT_MW_SHARED_PHYS_RANGE_CMB1_GLOBAL_START) is used in the topology map definition. As illustrated in FIGS. 6*e*-1 and 6*e*-2, the allocation size of the Combined Pool is validated against the boundary of the selected memory range size. In the above example, the data buffer size was incorrectly sized to 65000.

Figure 7:
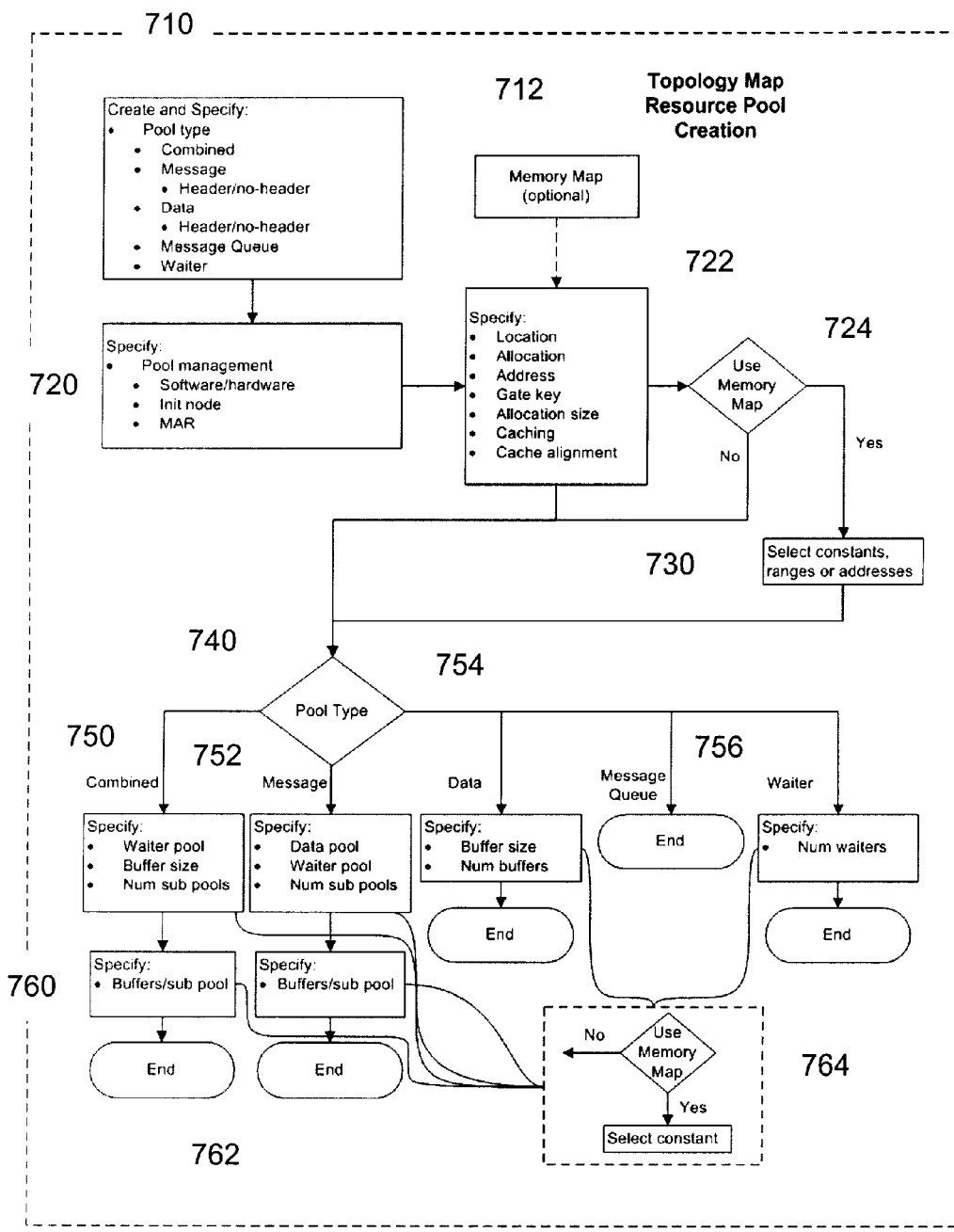
FIG. 7 illustrates an exemplary embodiment of a process for topology map resource pool creation.

FIG. 7 illustrates an embodiment of a process for topology map resource pool creation. In some embodiments, the process illustrated in FIG. 7 corresponds to step 630 in FIG. 6*a*. The process generally starts at step 710 where pool types are defined and content specified. Message headers may further be located in message or data pools, for performance optimization, data integrity and security purposes. In step 712, an optional memory map may be provided.

In step 720, pool management properties, such as software or hardware management, initialization node and MAR association, a memory map definition may be referenced, by using the identifiers, i.e. symbolic definition, in the resource configuration providing multicore platform portability for the resources. In step 722, allocation properties, such as local or global location, virtual or physical addressing, address (physical) and/or key (virtual), lock key, allocation size, caching and cache alignment are configured.

The process determines in step 724 whether a memory map is being used. If no memory map is being used, the process proceeds to step 740. If a memory map is being used, the process proceeds to step 730 where memory map definitions may be referenced by the identifiers in the symbolic definitions. As an example, the memory map definitions may be referenced by selecting constants, ranges, or addresses included in the memory map definition. FIGS. 6*b* and 6*c*1-2 provide examples of how the memory map is referenced in the creation of the pool. Particularly, these figures provide examples of using memory map identifiers during the resource pool creation process. The process proceeds to step 740 to determine the pool type as one of a waiter pool, data pool, message pool, message queue pool, or combined pool. Once the pool type is determined the process proceeds one of steps 750-756 to specify the properties of the respective determined pool type such as number of buffers, buffer size, number of sub pools, number of waiters. If the determined pool type is combined or message pools, process proceeds to steps 760 and 762, respectively, to specify the number of buffers per sub pool. Memory map definitions may be referenced by the identifiers in the symbolic definitions (764) in anyone of steps 750-762.

Figure 8:
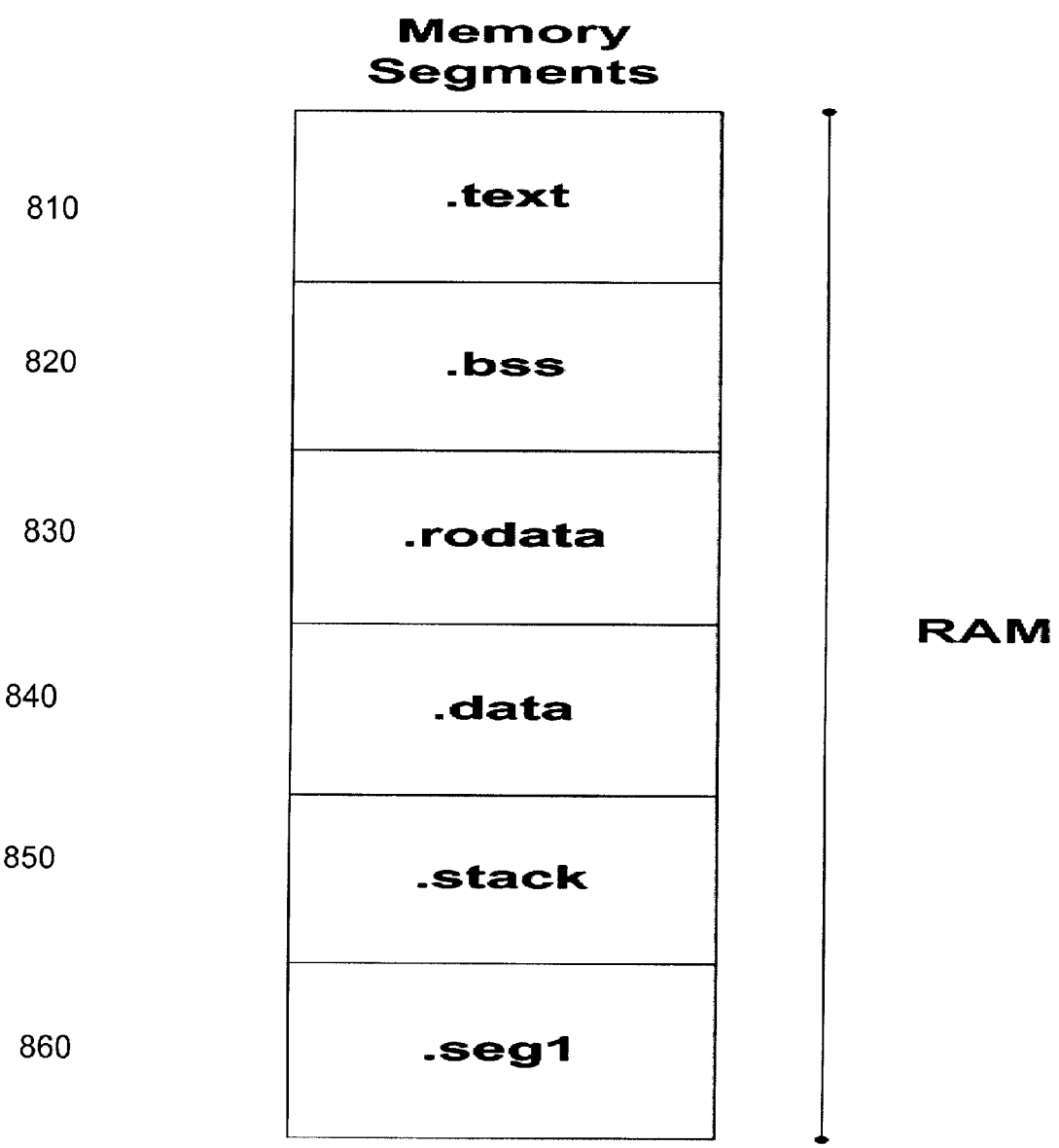
FIG. 8 illustrates an exemplary embodiment of dividing memory into segments using linker directives.

FIG. 8 illustrates an embodiment for dividing memory into segments using linker directives. For example, linker directives are used to specify segments, e.g. .text (program instructions) 810, .bss (uninitialized data) 820, .rodata (read only data) 830, .data (initialized data) 840, .stack (program stack) 850, and .seg1 (user defined segment) 860. As an example, a segment (.seg1) could be reserved in the linker command file to be used section from a memory map definition. For example, .seg1 (860) could be defined as MAR1_Pools_DDR3 (see FIG. 10, 1020). Accordingly, the linker directives serve as a memory layout for a portion of memory in which a memory map may divide into smaller blocks.

Figure 9A:
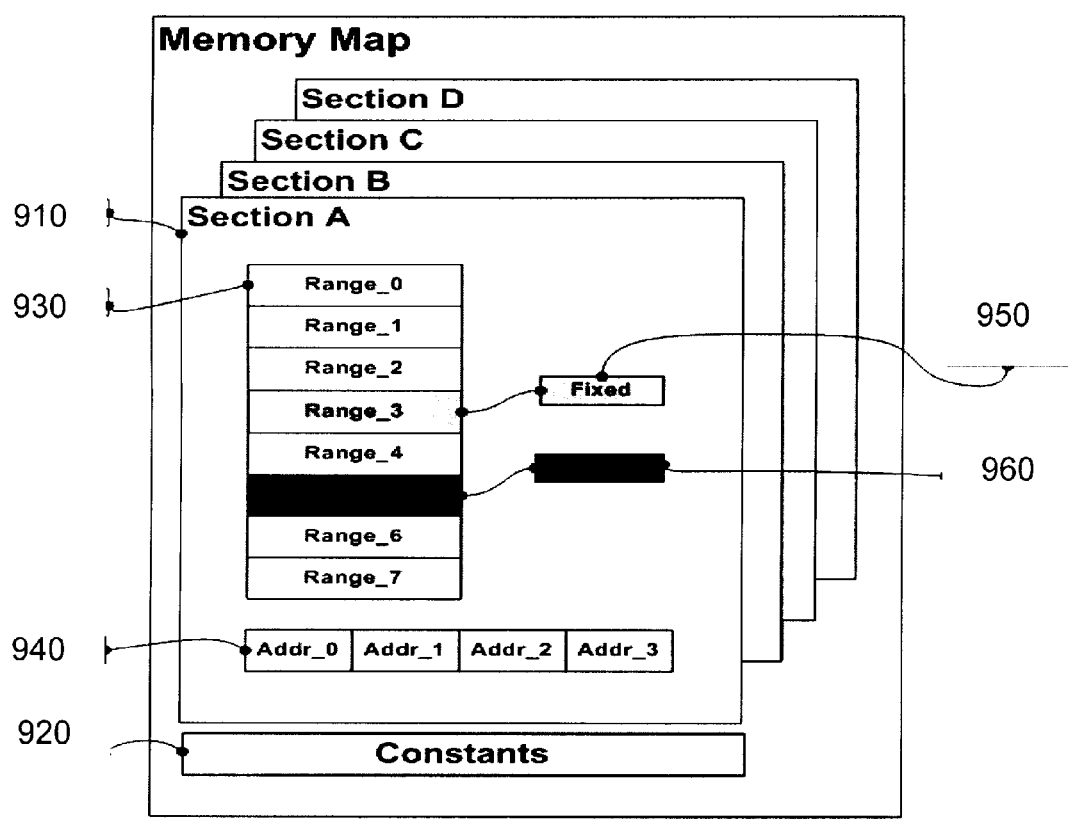
FIG. 9a illustrates an exemplary embodiment of a portable memory map method for mapping, configuring, and allocating memory.

FIG. 9*a* illustrates an embodiment of a portable memory map method for mapping, configuring, and allocating memory. As an example, a memory map consists of sections 910 (representing the segments) and constants 920. Sections contain ranges 930, which are blocks of memory, and addresses 940, representing individual locations of words of data (byte or larger word size). For example, as illustrated in FIG. 9*a*, Section A includes Ranges Range_0 to Range_7 and address Addr_0 to Addr_3. Ranges can be fixed 950, i.e. they will not be relocated within a section of other ranges that are resized or deleted. The ranges can also be reserved 960, i.e. they are not to be used by system or application software. The Memory-Map is validated and a memory map definition, and optionally linker command files are generated. The memory map definition contains symbolic definitions providing for software portability. The memory map definition for section A is illustrated in FIGS. 9*b*-9*d*.

FIG. 10 illustrates example excerpts from a generated memory map definition, specifying the start address and size of a section specifying the symbolic definitions representing the multicore platform memory layout 1010 and excerpts from a generated linker command file 1020, reserving the corresponding section space as illustrated in the memory layout 1030.

Exemplary Application of Portable Memory Maps

As an example of applying portable memory maps, an experiment was performed using a signal processing filter application, developed functionally on a Intel x86 based PC running Linux, without requiring access to the target hardware multicore platform, and subsequently transferred to the target platform. The target platform was based on the Texas Instruments TMS320C6678, 8 core digital signal processor (DSP).

The application was developed on a Linux platform using a portable memory map in accordance with the embodiments described herein, a topology map, and using the MCAPI multicore communications API for communication between the cores. The application had a two stage filter (Filter1 and Filter2), which was duplicated to run in parallel for improved performance. Once the application was functionally developed and it was time to move to the target hardware platform, the memory and topology maps were modified to accommodate the application and the application was transferred from the PC (i.e., Linux platform) to the multicore DSP platform with minor changes. As an example, the memory map for the development platform was saved as a new memory map (i.e. saved as a new file) and modified in accordance with the memory map of the target platform.

Figure 11A:
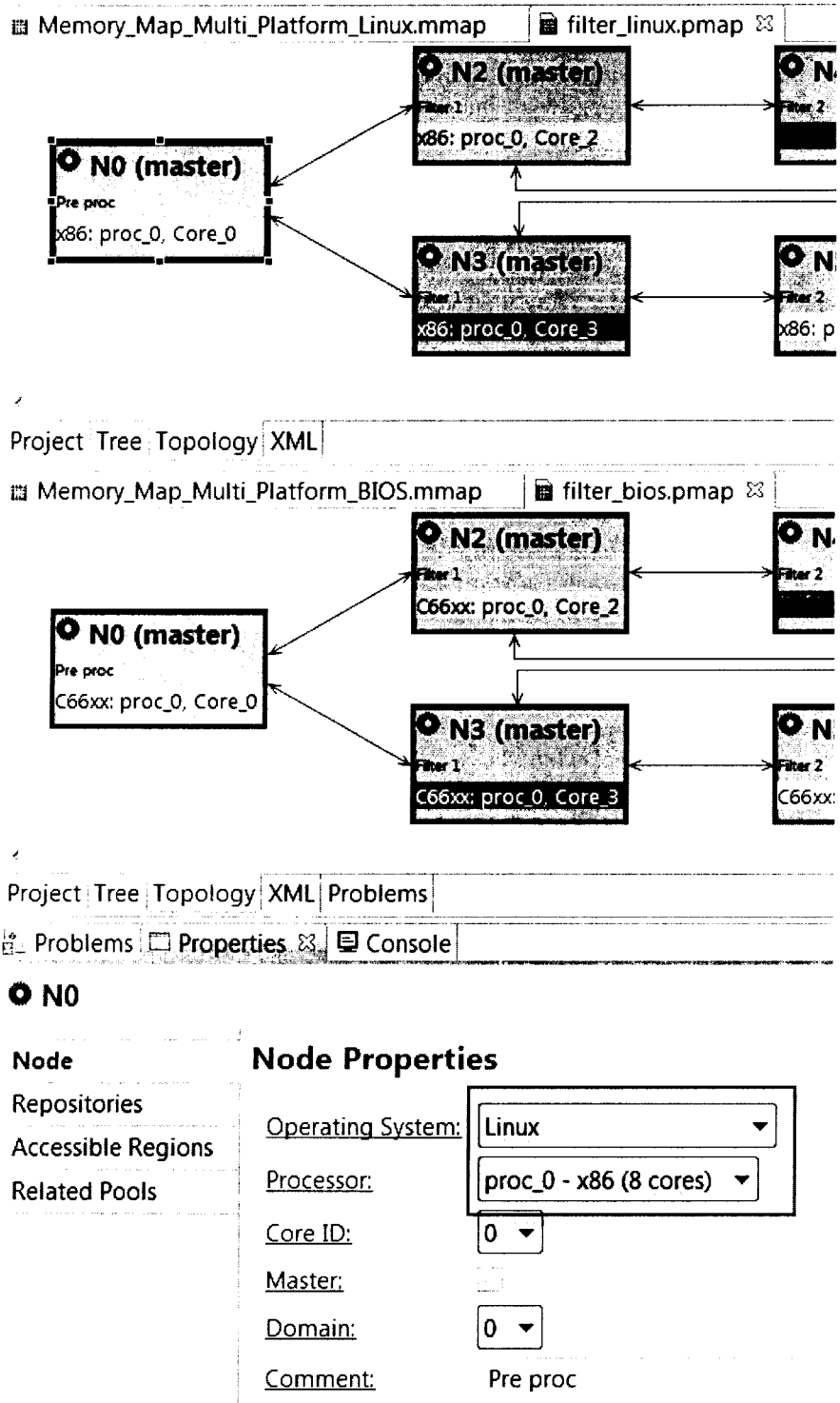
Figure 11B:
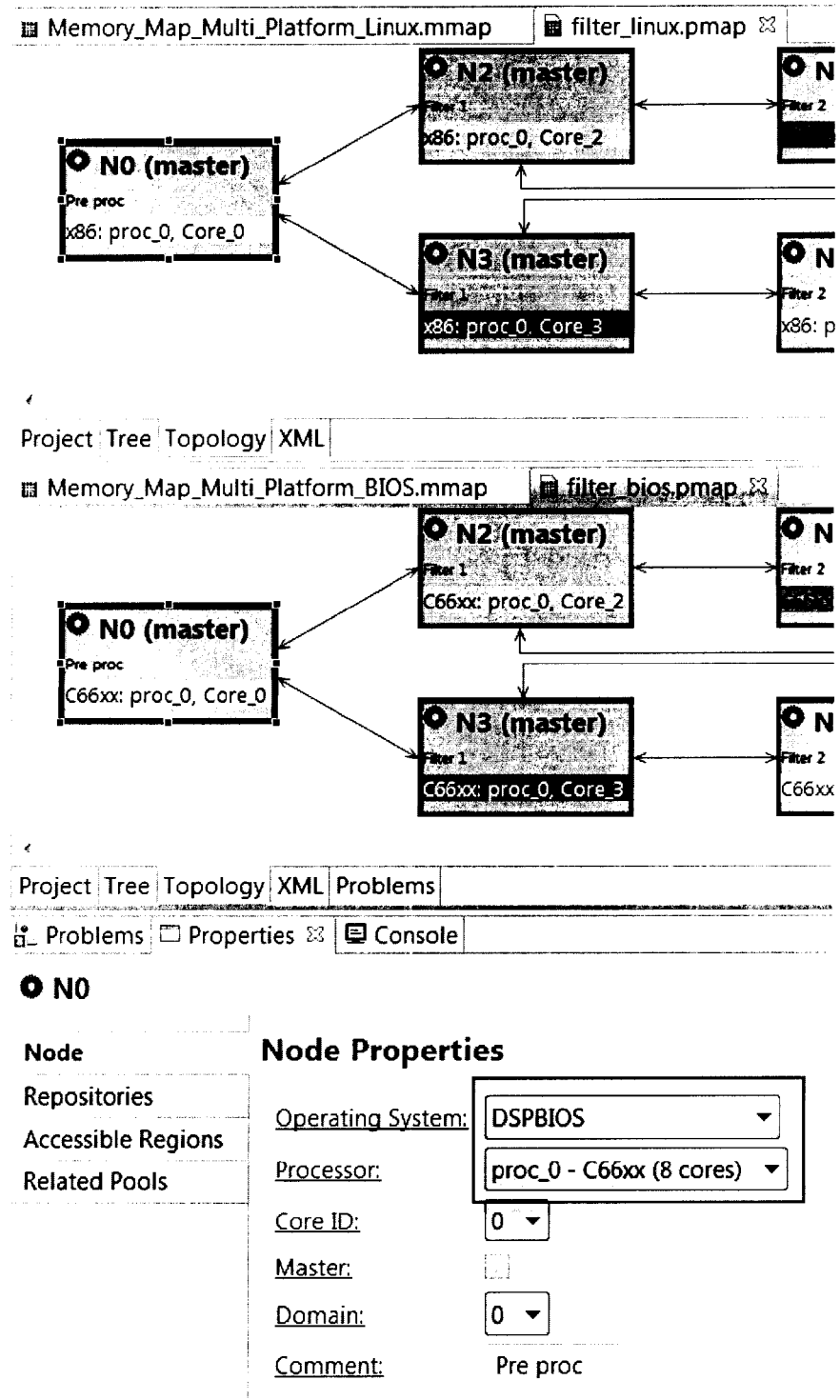
Figures 11C, 11D:
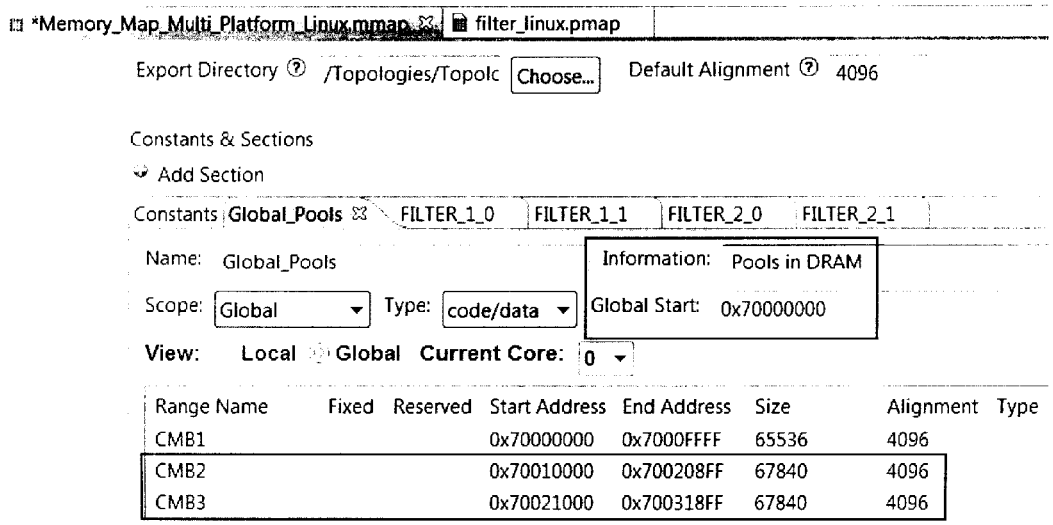
Figure 11E:
Figure 11F:
Figure 11G:

FIG. 11a illustrates an example topology map of the development platform (Linux/x86). FIG. 11b illustrates an example topology map for the a target platform (DSPBIOS/C6678). FIGS. 11c-11j provide an illustration of how the memory map of the development platform was modified to correspond to the memory layout of the target platform. As illustrated in FIG. 11c, message pools used for data transfers were located in regular DRAM memory on the PC and placed in faster core local SRAM on the target platform (FIG. 11f). FIG. 11d illustrates the range identifier for the PC platform while FIG. 11g illustrates the range identifier for the target platform. As illustrated in FIG. 11e, the data was moved from filter stage one to filter stage two, using soft copy on the PC whereas on the target platform, as illustrated in FIG. 11h, data was moved using DMA (Direct Memory Access) assisted transfers between local SRAMs from the filter stage one core to the filter stage two core. As an example, a soft copy is when the CPU is moving the data, byte by byte, e.g. using the memcpy( ) function (standard function). In the other case when using a DMA, the CPU is involved in setting up the DMA transaction, but the DMA performs the data movement without further involvement by the CPU.

As illustrated in FIG. 11i, the arrays holding the filter coefficients and data were located in regular DRAM memory on the PC and placed in faster core local SRAM on the target platform as illustrated in FIG. 11j.

Illustrated below is an example piece of code for the filter application. As illustrated below, accessing the coefficient and data arrays in the filter application was done the same way on the development platform (i.e., Linux) and the target platform. In this regard, the code illustrated below uses identifiers that are specified in both the memory maps of the development and target platform. However, on the development platform the identifiers are mapped to DRAM and on the target platform, the identifiers are mapped to the SRAM.

The above described filter application was conveniently developed and functionality tested on the PC with no access to target platform required. The application was transferred to the target multicore signal processing platform by simple modification of the memory and topology maps and little to no change to the application. The portable memory maps and topology maps provided the application portability from the first multicore platform to the second multicore platform. Through the use of the memory maps and topology maps, the application was optimally applied to the memory layout of the multicore DSP platform, using core local SRAM memory for computation and DMA transfers between the SRAM memories for efficient memory utilization. The portable memory maps and topology maps can rapidly be applied to a multitude of multicore platforms in a similar fashion.

Figure 12:
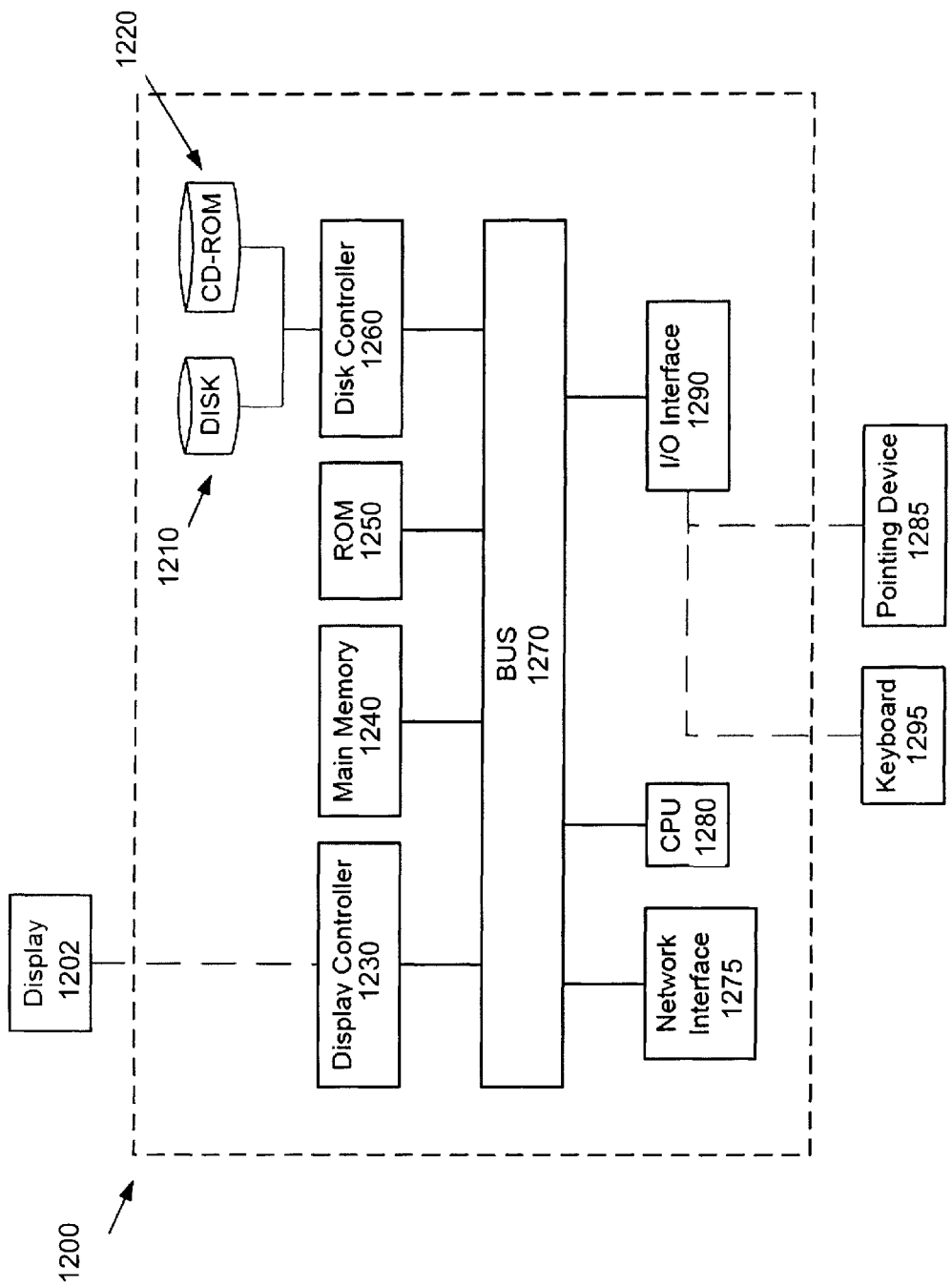
FIG. 12 illustrates as exemplary processor diagram.

FIG. 12 is a block diagram of a processor 1200. In some embodiments, the processor 1200 is configured to perform anyone of the above methods. In further embodiments, the memory map and topology map editor tools are implemented on the processor 1200. While FIG. 2 illustrates a multicore computer, FIG. 12 is an example of a single core computer. According to some embodiments, the target platform for which the memory map is created may be a single core computer, a multicore computer, a virtualized computer, or a combination thereof. An example of a virtualized computer includes a virtual machine running on one or more single core or multicore computers, or a combination thereof.

In one embodiment, the processor 1200 includes a CPU 1280 which processes data and instructions stored in main memory 1240 and/or ROM 1250. The CPU 1280 also processes information stored on the disk 1210 or CD-ROM 1220. As an example, the CPU 1280 is an IBM System X from IBM of America employing at least one Xenon processor from Intel of America or an Opteron processor from AMD of America. Thus, instructions corresponding to a process in a mobile device is stored on any one of the disk 1210, CD-ROM 1220, main memory 1240 or ROM 1250.

In one embodiment, the processor 1200 also includes a network interface 1275, such as an Intel Ethernet PRO network interface card from Intel Corporation of America, a display controller 1230, such as a NVIDIA GeForce GTX graphics adaptor from NVIDIA Corporation of America for interfacing with a display 1202, such as a Hewlett Packard HP L2445w LCD monitor. The processor 1200 also includes an I/O interface 1290 for interfacing with a keyboard 1295 and pointing device 1285, such as a roller ball or mouse. According to some embodiments, the disk controller 1260 interconnects disk 1210, such as a hard disk drive or FLASH memory drive, and CD-ROM 1220 or DVD drive with bus 1270, which is an ISA, EISA, VESA, PCI, or similar for interconnecting all of the components of the server 1200. A description of the general features and functionality of the display 1202, keyboard 1295 and pointing device 1285, as well as the display controller 1230, disk controller 1260, network interface 1275 and I/O interface 1290 is also omitted for brevity as these features are well known. Of course, other processor and hard-

```
/* Call the filter1 routine */
filter1
(
    MMAP_CROSS_PLATFORM_SECT_FILTER_1_0_RANGE_COEFFICIENT_0_CORE2_GLOBAL_START,
    MMAP_CROSS_PLATFORM_CONST_FILTER_NUM_SAMPLES,
    MMAP_CROSS_PLATFORM_SECT_FILTER_1_0_RANGE_INPUT_ARRAY_1_CORE2_GLOBAL_START,
    MMAP_CROSS_PLATFORM_SECT_FILTER_1_0_RANGE_OUTPUT_ARRAY_1_CORE2_GLOBAL_START
);
``` ware vendors and types are known in the art such as Freescale ColdFire, i.MX and ARM processors from Freescale Corporation of America.

The example processor 1200 of FIG. 12 is a hardware platform of a computing device, such as a PC, and CPU 1280 is an Intel Pentium Processor, or any other desired processor known in the art. The computer-readable instructions stored on any one of the main memory 1240, ROM 1250, disk 1210 or CD-ROM 1220 is provided as a utility application, background daemon, or component of an operating system, or combination thereof, executing in conjunction with CPU 1280 and an operating system such as Microsoft VISTA, UNIX, Solaris, LINUX, Apple MAC-OS and other systems known to those skilled in the art.

Main memory 1240 is a random access memory (RAM), FLASH memory, EEPROM memory, or the like, while ROM 1250 is Read Only Memory, such as PROMs. Further descriptions of the main memory 1240 and the ROM 1250 are omitted for brevity as such memory is well known.

In additional embodiments, the memory map editor tool and topology map editor tool are stored on a general server or cloud server and accessed remotely from the processor 1200 to create the memory map and topology maps described herein.

Thus, the foregoing discussion discloses and describes exemplary embodiments of the present advancements only. Accordingly, the disclosure of the present advancements is intended to be illustrative, but not limiting with respect to scope. The disclosure, including any readily discernible variants of the teachings herein, define, in part, the scope of the attached claim terminology.

The invention claimed is:

1. A computer-implemented method for generating a memory map of a target computer, comprising:
   specifying, from a plurality of identifiers stored in a memory of a host computer, at least one identifier associated with a memory layout of the target computer;
   specifying at least one value associated with the specified at least one identifier;
   generating a memory map definition of the memory map using the specified at least one identifier and the associated at least one value; and
   deploying software on the target computer, the software incorporating the memory map definition and including an executable instruction that references the specified at least one identifier which is replaced with the associated at least one value.

2. The computer-implemented method according to claim 1, wherein the target computer is a single core computer or a multicore computer, a virtualized computer, or a combination thereof.

3. The computer-implemented method according to claim 1, wherein the target computer and host computer is the same computer or are different computers.

4. The computer-implemented method according to claim 1, wherein the specified at least one identifier is replaced with the associated at least one value before a time of use in the software execution.

5. The computer-implemented method according to claim 1, wherein the specified at least one identifier is replaced with the associated at least one value at a time of use in the software execution.

6. The computer-implemented method according to claim 1, wherein the memory map is validated upon determination that the specified at least one identifier does not violate a predetermined condition.

7. The computer-implemented method according to claim 6, wherein the memory map definition is generated in a portable descriptor file format upon validation of the memory map.

8. The computer-implemented method according to claim 1, wherein the memory layout is segregated into memory map sections defined in the memory map definition and linker files are generated from the memory map definition for integration of the memory map sections with linker defined sections.

9. The computer-implemented method according to claim 1, wherein the memory map is linked to a topology map of the target computer, the topology map including at least one node corresponding to one or more functions of the software.

10. The computer-implemented method according to claim 1, wherein the software is portable from a first platform to a second platform without modifications to the software.

11. The computer-implemented method according to claim 1, wherein
   the memory layout includes a first type of memory and a second type of memory faster than the first type of memory, and
   the specified at least one identifier is associated with only the second type of memory for optimal memory utilization.

12. The computer-implemented method according to claim 9, wherein the memory map definition is incorporated in a specification and configuration of topology map resource pools of the topology map.

13. The computer-implemented method according to claim 1, wherein the memory map is reconfigured and validated, and the memory map definition is regenerated using the reconfigured memory map without changing the software.

14. The computer-implemented method according to claim 1, wherein the memory map definition and topology map definition are built in combination with the linker command files and runtime libraries for execution on the target computer.

15. The computer-implemented method according to claim 1, wherein the memory map further includes a multi-platform-definition containing platform specific values to automate generation of one or more memory map definitions for a multitude of multicore platforms.

16. The computer-implemented method according to claim 1, further comprising:
   deploying the software that uses the memory map definition on another target computer having a memory layout different than the memory layout of the target computer.

17. A host computer comprising:
   a memory; and
   a processor configured to
      specify, from a plurality of identifiers stored in the memory of the host computer, at least one identifier associated with a memory layout of a target computer;
      specify at least one value associated with the specified at least one identifier,
      generate a memory map definition of the memory map using the specified at least one identifier and the associated at least one value, and
      deploy software on the target computer, the software incorporating the memory map definition and including an executable instruction that references the specified at least one identifier which is replaced with the associated at least one value.

18. The host computer according to claim 17, wherein the target computer is a single core computer or a multicore computer, a virtualized computer, or a combination thereof.

19. The host computer according to claim 17, wherein the target computer and host computer is the same computer or are different computers.

20. The host computer according to claim 17, wherein the specified at least one identifier is replaced with the associated at least one value before a time of use in the software execution.

21. The host computer according to claim 17, wherein the specified at least one identifier is replaced with the associated at least one value, by the target computer, at a time of use in the software execution.

22. The host computer according to claim 17, wherein the processor is further configured to validate the memory map upon determination that the specified at least one identifier does not violate a predetermined condition.

23. The host computer according to claim 22, wherein the processor is further configured to generate the memory map definition in a portable descriptor file format upon validation of the memory map.

24. The host computer according to claim 17, wherein the memory layout is segregated into memory map sections defined in the memory map definition and linker files are generated from the memory map definition for integration of the memory map sections with linker defined sections.

25. The host computer according to claim 17, wherein the memory map is linked to a topology map of the target computer, the topology map including at least one node corresponding to one or more functions of the software.

26. The host computer according to claim 17, wherein the target computer software is portable from a first platform to a second platform without modifications to the software.

27. The host computer according to claim 17, wherein in the target computer,
the memory layout includes a first type of memory and a second type of memory faster than the first type of memory, and
the specified at least one identifier is associated with only the second type of memory for optimal memory utilization.

28. The host computer according to claim 25, wherein the memory map definition is incorporated in a specification and configuration of topology map resource pools of the topology map.

29. The host computer according to claim 17, wherein the memory map is reconfigured and validated, and the memory map definition is regenerated using the reconfigured memory map without changing the software.

30. The host computer according to claim 17, wherein the memory map definition and topology map definition are built in combination with the linker command files and runtime libraries for execution on the computer.

31. The host computer according to claim 17, wherein the memory map further includes a multi-platform-definition containing platform specific values to automate generation of one or more memory map definitions for a multitude of multicore platforms.

32. The host computer according to claim 17, wherein the processor is further configured to:
deploy the software that uses the memory map definition on another target computer having a memory layout different than the memory layout of the target computer.

33. A non-transitory computer readable medium having executable instructions stored therein, which when executed by a processor of a host computer causes the processor to perform a method for generating a memory map of a target computer, the method comprising:

specifying, from a plurality of identifiers stored in a memory of the host computer, at least one identifier associated with a memory layout of the target computer;
specifying at least one value associated with the specified at least one identifier;
generating a memory map definition of the memory map using the specified at least one identifier and the associated at least one value; and
deploying software on the target computer, the software incorporating the memory map definition and including an executable instruction that references the specified at least one identifier which is replaced with the associated at least one value.

34. The non-transitory computer readable medium according to claim 33, wherein the target computer is a single core computer or a multicore computer, a virtualized computer, or a combination thereof.

35. The non-transitory computer readable medium according to claim 33, wherein the target computer and host computer is the same computer or are different computers.

36. The non-transitory computer readable medium according to claim 33, wherein the specified at least one identifier is replaced with the associated at least one value before a time of use in the software execution.

37. The non-transitory computer readable medium according to claim 33, wherein the specified at least one identifier is replaced with the associated at least one value at a time of use in the software execution.

38. The non-transitory computer readable medium according to claim 33, wherein the memory map is validated upon determination that the specified at least one identifier does not violate a predetermined condition.

39. The non-transitory computer readable medium according to claim 38, wherein the memory map definition is generated in a portable descriptor file format upon validation of the memory map.

40. The non-transitory computer readable medium according to claim 33, wherein the memory layout is segregated into memory map sections defined in the memory map definition and linker files are generated from the memory map definition for integration of the memory map sections with linker defined sections.

41. The non-transitory computer readable medium according to claim 33, wherein the memory map is linked to a topology map of the target computer, the topology map including at least one node corresponding to one or more functions of the software.

42. The non-transitory computer readable medium according to claim 33, wherein the software is portable from a first platform to a second platform without modifications to the software.

43. The non-transitory computer readable medium according to claim 33, wherein
the memory layout includes a first type of memory and a second type of memory faster than the first type of memory, and
the specified at least one identifier is associated with only the second type of memory for optimal memory utilization.

44. The non-transitory computer readable medium according to claim 41, wherein the memory map definition is incorporated in a specification and configuration of topology map resource pools of the topology map.

45. The non-transitory computer readable medium according to claim 33, wherein the memory map is reconfigured and validated, and the memory map definition is regenerated using the reconfigured memory map without changing the software.

46. The non-transitory computer readable medium according to claim 33, wherein the memory map definition and topology map definition are built in combination with the linker command files and runtime libraries for execution on the target computer.

47. The non-transitory computer readable medium according to claim 33, wherein the memory map further includes a multi-platform-definition containing platform specific values to automate generation of one or more memory map definitions for a multitude of multicore platforms.

48. The non-transitory computer readable medium according to claim 33, further comprising:
   deploying the software that uses the memory map definition on another target computer having a memory layout different than the memory layout of the target computer.

* * * * *